United States Patent
Reymond et al.

(10) Patent No.: US 8,963,540 B2
(45) Date of Patent: Feb. 24, 2015

(54) HALL-EFFECT-BASED ANGULAR ORIENTATION SENSOR AND CORRESPONDING METHODS AND DEVICES

(75) Inventors: Serge Reymond, Geneva (CH); Pavel Kejik, Ecublens (CH)

(73) Assignee: Sensima Technology SA, Gland (CH)

( * ) Notice: Subject to any disclaimer, the term of this patent is extended or adjusted under 35 U.S.C. 154(b) by 338 days.

(21) Appl. No.: 13/606,441

(22) Filed: Sep. 7, 2012

(65) Prior Publication Data

US 2014/0070796 A1     Mar. 13, 2014

(51) Int. Cl.
*G01D 5/14* (2006.01)
(52) U.S. Cl.
CPC ..................................... *G01D 5/145* (2013.01)
USPC .............. 324/207.2; 324/207.11; 324/207.12; 702/150
(58) Field of Classification Search
CPC ....................................................... G01D 5/145
USPC ............... 324/207.2, 207.11, 207.12, 207.13, 324/207.14, 207.24, 207.25, 207.26, 244, 324/251, 260; 702/150, 151, 152, 153
See application file for complete search history.

(56) References Cited

U.S. PATENT DOCUMENTS

| | | | |
|---|---|---|---|
| 4,013,946 A * | 3/1977 | Lewis ........................... | 324/247 |
| 8,078,425 B2 * | 12/2011 | Bernard et al. ............... | 702/151 |
| 8,508,218 B2 * | 8/2013 | Reymond et al. .......... | 324/207.2 |

* cited by examiner

*Primary Examiner* — Arleen M Vazquez
*Assistant Examiner* — Robert P Alejnikov, Jr.
(74) *Attorney, Agent, or Firm* — Rankin, Hill & Clark LLP

(57) ABSTRACT

A sensor for sensing an angular orientation of a magnetic field of a magnet includes: N≥2 Hall effect devices (HD1, HD2, . . . ), each having a detection direction and including a first and a second pair of connectors, wherein, in presence of the magnetic field, a flow of an electric current between the connectors of the first pair allows to pick up a Hall voltage between the connectors of the second pair induced by the magnetic field, unless a magnetic field component of the magnetic field along the detection direction is zero, wherein the N Hall effect devices are aligned such that they have a common detection direction lying along an axis; a filtering-or-resonating unit (F) comprising an input and an output, wherein a signal outputted from the output is referred to as filtered signal.

23 Claims, 8 Drawing Sheets

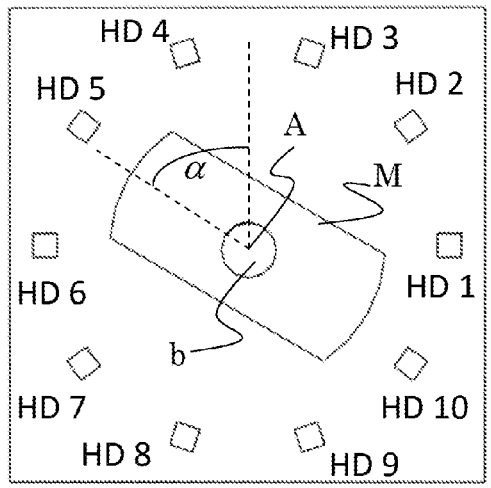
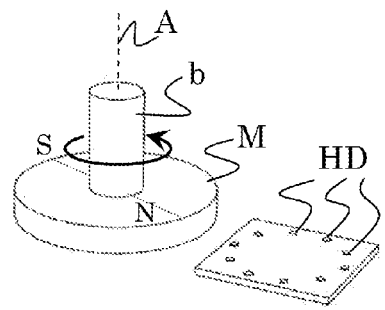
Fig. 14
Fig. 6
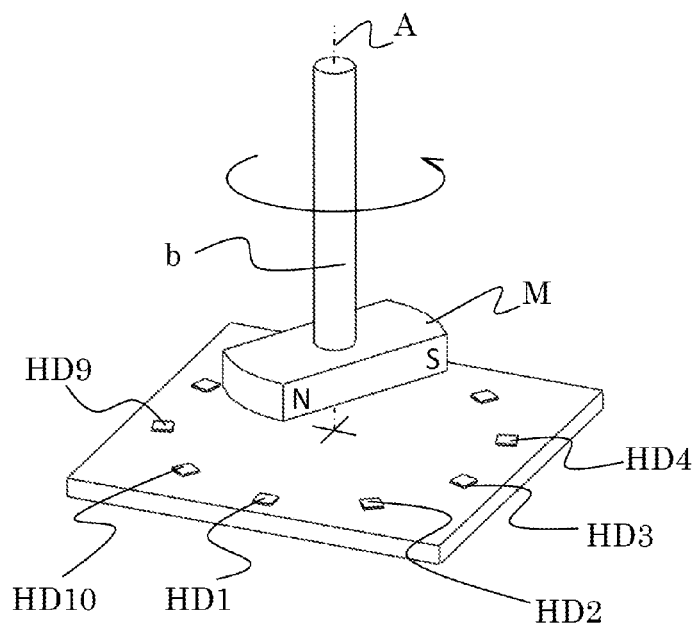
Fig. 7

HALL-EFFECT-BASED ANGULAR ORIENTATION SENSOR AND CORRESPONDING METHODS AND DEVICES

TECHNICAL FIELD

The invention relates to the field of sensing the angular orientation of a magnetic field by means of the Hall effect. In particular, the invention relates to a sensor for sensing an angular orientation of a magnet producing a magnetic field, and this way, also rotational speeds or related magnitudes can be derived. The invention relates to methods and apparatuses according to the opening clauses of the claims. Corresponding devices find application in many areas, e.g., in position sensing and in rotation speed measuring, e.g., in electric motors and in automotive and aircraft industry.

BACKGROUND OF THE INVENTION

In the state of the art, several ways of determining the angular orientation of a magnetic field using the Hall effect are known. In many cases, it is sufficient to restrict to an orientation within a plane or onto an axis, i.e. to determine the angular orientation of a the projection of the magnetic field into that plane and onto that axis, respectively.

For example, it is known to use two orthogonally arranged Hall devices and convert their respective Hall voltages into a digital number using analog-digital converters. The angle representing the wanted angular orientation is then derived by calculating the inverse tangent (arc tangent, ATAN) of the ratio of these two numbers, wherein typically a digital controller such as a microcontroller computes the ATAN function using either a CORDIC algorithm or a lookup table.

This solution has several rather undesirable consequences. A relatively high amount of energy is consumed, since two analog-digital converters and usually also a microcontroller are involved. And in addition, a microcontroller furthermore generally introduces a time delay, and in particular, the time needed for initializing the microcontroller will add up to the delay. Furthermore, the microcontroller is software-controlled, and in some applications such as in aircraft industry, the use of software in a sensor system requires a special and relatively tough qualification procedure.

A specific implementation of a similar solution is disclosed in U.S. Pat. No. 6,288,533. In order to achieve some insensitivity with respect to undesired (parasitic) magnetic fields, it is suggested in U.S. Pat. No. 6,288,533 to provide at least two Hall device pairs and to form the difference between the Hall voltages of the respective Hall devices of each pair. Undesired magnetic fields being substantially homogeneous in the region where the respective Hall device pair is located, do thus not contribute to the difference signal. A numerical computation involving the difference signals is then performed, basically by calculating the arctangent of the ratio between two difference signals. This method requires, for obtaining a single angular position, digitizing two signals and computing an arc tangent, which results in a considerable consumption of time and electrical power.

In order to be able to dispense with the analog-digital conversion of two signals, phase-sensitive systems have been suggested, e.g., in U.S. Pat. No. 4,163,326. Phase-sensitive systems are typically configured in such a way that at the output of the sensors a sine signal is obtained the phase of which represents the angle to be measured. The advantage is that the signal can be fed to a simple phase detection circuit for obtaining the desired angle. Various methods for generating a signal the phase of which contains the desired angular information have already been proposed. U.S. Pat. No. 4,163,326 discloses an electronic compass based on Hall devices and implementing a phase-sensitive system.

E.g., in EP 2 028 450 A2, a desired signal is generated by summing up the outputs of two orthogonally arranged Hall effect devices (one of the devices being inclined with respect to the other by an angle of 90°). For accomplishing this, the Hall effect devices are provided with bias currents of sine shape which have identical amplitudes and are shifted by 90° with respect to each other. The generation of the required sine wave currents is relatively challenging and costly, and if the phase shift is not exactly 90° and/or if the amplitude of the sine waves is not equal, the outputted angular information does not precisely reflect the magnetic field orientation.

Another method is disclosed in WO 2008/145 662 A1. Therein, it is suggested to provide a particular sensing structure which can be considered a circular vertical Hall device which naturally produces a sine wave output. From the sine signal, a PWM signal proportional to the angle can be readily obtained. The manufacture of the required special Hall device is relatively costly, and the time required for a measurement is relatively long.

From EP 1 967 824 A1, a sensor arrangement to be used with a rotatable magnetic source is known in which signals outputted by magnetic field sensors are digitized and corresponding digital sensor values are fed to an evaluation unit. The evaluation unit then computes a rotation angle from a portion of the digital sensor values.

It is desirable to provide an alternative way of determining the angular orientation of a magnet producing a magnetic field.

SUMMARY OF THE INVENTION

Therefore, one object of the invention is to create an alternative way of determining the angular orientation of a magnet producing a magnetic field. A sensor for sensing an angular orientation of a magnet producing a magnetic field and, in addition, a respective method for sensing an angular orientation of a magnet producing a magnetic field shall be provided. Furthermore, a device or arrangement comprising such a sensor shall be provided and a method for manufacturing a sensor for sensing an angular orientation of a magnet producing a magnetic field.

Another object of the invention is to provide a way of determining such an angular orientation which is implemented relatively easily.

Another object of the invention is to provide a way of determining such an angular orientation which yields particularly accurate results.

Another object of the invention is to provide a way of determining such an angular orientation which is particularly insensitive to parasitic (disturbing) magnetic fields, in particular to magnetic fields which are spatially approximately constant, e.g., produced by a magnet located far away from the sensing area.

Another object of the invention is to provide a particularly energy-efficient way of determining the such an angular orientation.

Another object of the invention is to provide a relatively simple way of determining such an angular orientation, in particular by dispensing with complex components or procedures.

Another object of the invention is to provide a particularly fast way of determining such an angular orientation.

Another object of the invention is to provide a suitable sensor having a good manufacturability.

Another object of the invention is to provide an improved an angular position sensor.

Another object of the invention is to provide an improved rotary encoder.

Another object of the invention is to provide an improved rotation speed sensor.

Another object of the invention is to provide an improved revolution counter.

Another object of the invention is to provide an improved electric motor.

Another object of the invention is to provide an electric motor of particularly small dimensions.

Further objects emerge from the description and embodiments below.

At least one of these objects is at least partially achieved by apparatuses and methods according to the patent claims.

The sensor for sensing an angular orientation of a magnet producing a magnetic field comprises $N \geq 2$ Hall effect devices, each having a detection direction and comprising a first and a second pair of connectors, wherein, in presence of said magnetic field, a flow of an electric current between the connectors of said first pair allows to pick up a Hall voltage between the connectors of the second pair induced by said magnetic field, unless a magnetic field component of said magnetic field along said detection direction is zero, wherein said N Hall effect devices are aligned such that they have a common detection direction lying along an axis;

a filtering-or-resonating unit comprising an input and an output, wherein a signal outputted from said output is referred to as filtered signal;

a wiring unit operationally connected to the respective second pair of connectors of each of said N Hall effect devices, structured and configured for selectively operationally connecting, in particular wiring, the connectors of said second pairs to said input of said filtering-or-resonating unit;

a control unit structured and configured for controlling said wiring unit in such a way that during a first time period of a duration Tf and in a fixed sequence of said N Hall effect devices, each of said N Hall effect devices is, with its second pair of connectors, successively operationally connected to said input of said filtering-or-resonating unit;

an output unit operationally connected to said output of said filtering-or-resonating unit structured and configured for obtaining from a filtered signal an output signal related to said angular orientation and outputting said output signal;

wherein said filtering-or-resonating unit is structured and configured for altering an inputted signal of a fundamental frequency f=1/Tf, said inputted signal containing, in addition to said fundamental frequency, higher harmonics, in such a way that an intensity of said higher harmonics is decreased relative to an intensity of said fundamental frequency.

Such a sensor can make possible to sense an angular orientation of a magnet or magnetic field in high precision and in high speed while using relatively simple components only. Such a sensor can be constructed in a relatively simple way without lacking measuring accuracy. In addition, such a sensor can be realized in silicon using solely CMOS processes.

Said Hall effect devices are usually spatially separate Hall effect devices, in particular distributed with respect to coordinates perpendicular to a coordinate along said axis.

With respect to said detection direction, it is to be noted that this is not a directed object, as it does not have a sense of direction or orientation like an arrow; it is rather an object like a line. One can say that the detection directions of said N Hall effect devices are aligned parallel to each other (and parallel to said axis).

Said angular orientation can in particular be an angular orientation referring to said axis. It is well possible to realize such a sensor by means of so-called Hall plate devices. Such Hall effect devices can be realized relatively simply in a semiconductor wafer, wherein the detection directions of the Hall effect devices are aligned perpendicular to the wafer plane.

In an attempt to make the invention better understandable, one can say that the N Hall effect devices are read out in such a way that the read-out sequence of Hall voltages mimics a sine wave, the sine wave having the frequency f, and the mimicking is realized in form of a step-function, in form of a staircase signal. The filtering-or-resonating unit emphasizes the (fundamental) frequency f while suppressing other frequencies, in particular unavoidably occurring higher harmonics. And from the phase of the resulting sine or sine-like wave, the wanted angular orientation is derived, which is in particular accomplished by means of phase detecting which can be realized in a relatively simple way. Each of said time periods of duration Tf can be related to one period of the sine wave, wherein said time periods do not necessarily start at 0°.

One can also, roughly, say that a signal is produced which comprises time periods of a duration Tf during each of which Hall voltages of N Hall effect devices are concatenated; and in a so-obtained signal, frequency components other than f=1/Tf are attenuated (as well as possible). And, finally, a phase of the filtered signal can be determined and from that phase an angular orientation of a magnet can be derived.

The proposed way of sensing said angular orientation of said magnet can, in a particular aspect, be considered to be accomplished via sensing a spatial variation of a projection of a magnetic field vector of said magnetic field onto said axis. That way, said output signal can also be considered to be indicative of said spatial variation.

It can be provided that during said time period of duration Tf, each of said N Hall effect devices is (with its second pair of connectors) connected once to said input of said filtering-or-resonating unit. As will become clear further below in conjunction with "differential measurements", it is also possible to provide that during said time period of duration Tf, each of said N Hall effect devices is (with its second pair of connectors) connected twice to said input of said filtering-or-resonating unit.

The number N is positive integer of at least 2, and it can in particular amount to at least 3 or to at least 4. Generally, with higher N, signals inputted to the filtering-or-resonating unit are closer to a sine-shaped signal which facilitates filtering and can lead to more precise output signals. One can say that said N Hall effect devices form a set (or a first set) of Hall effect devices.

The altering accomplished in said filtering-or-resonating unit is usually a filtering.

Said fundamental frequency f can usually be referred to as a filter frequency or a resonance frequency.

In one embodiment, the sensor comprises exactly one filtering-or-resonating unit.

It is possible to provide that said filtering-or-resonating unit is also structured and configured for altering an inputted signal of a fundamental frequency f=1/Tf, said inputted signal containing, in addition to said fundamental frequency, lower frequencies (in particular up to a frequency of f/2), in such a way that an intensity of said lower frequencies is decreased relative to an intensity of said fundamental frequency.

In one embodiment which may be combined with one or more of the above-addressed embodiments, said filtering-or-resonating unit is or comprises a low pass filter, in particular, it comprises, in addition, an offset remover for removing any DC offsets, i.e. for removing voltages at 0 Hz.

In one embodiment which may be combined with the above-mentioned embodiment, said filtering-or-resonating unit is or comprises a band pass filter. A band pass filter can attenuate or remove frequencies above and below fundamental frequency f. This can be useful for obtaining filtered signals of particularly high quality which again can make possible to obtain highly accurate output signals.

In one embodiment which may be combined with one or more of the before-addressed embodiments, said filtering-or-resonating unit has a filter frequency fat which attenuation is minimum or amplification is maximum.

In one embodiment which may be combined with one or more of the before-addressed embodiments, in the resulting filtered signal, higher harmonics are decreased relative to the fundamental frequency f by at least 10 dB, in particular by at least 20 dB.

In one embodiment which may be combined with one or more of the before-addressed embodiments, in the resulting filtered signal, higher harmonics are decreased such that a resulting intensity of any higher harmonic amounts to at most −20 dB relative to the intensity of the fundamental frequency f.

In one embodiment which may be combined with one or more of the before-addressed embodiments, the attenuation by the filtering-or-resonating unit is at least 20 dB at $2f$, and in particular also at least 20 dB at f/2. An attenuation of 20 dB at $2f$ will typically result in a distortion of about 0.3° in the output signal corresponding to a sensing error of 0.3°.

In one embodiment which may be combined with one or more of the before-addressed embodiments, said filtering-or-resonating unit is or comprises a bandpass filter having a quality factor Q (also sometimes simply referred to as "quality") of about $Q=\pi/2$. Therein, $\pi$ designates Archimedes' Constant, approximately 3.14. In particular, said quality factor amounts to $Q=1.57\pm0.25$, or, for better results, to $Q=1.57\pm0.1$. This way, in measurements of rotating magnetic fields such as in rotation speed measurements, the naturally occurring phase shift at frequencies near the filter frequency f can be used for reducing, in particular for compensating for a time lag of the outputting of the output signal with respect to the time when the magnetic field in fact had the angular position indicated in the output signal. Said specific sequence will in this case be chosen in dependence of the direction of rotation of the magnetic field.

In one embodiment which may be combined with one or more of the before-addressed embodiments, said filtering-or-resonating unit comprises an amplifier, in particular an input amplifier for amplifying the Hall voltages before accomplishing the signal altering/signal filtering. But it is also possible that the filtering-or-resonating unit comprises (alternatively or additionally) other signal modifiers, e.g., an adder.

In typical setups and arrangement, said magnet is rotatable or tiltable about a rotation axis aligned along the before-mentioned axis.

Said output signal can be dependent on or indicative of said angular orientation.

In one embodiment which may be combined with one or more of the before-addressed embodiments, said N Hall effect devices are positioned in one and the same plane. This can facilitate the manufacture of the Hall effect devices, and it can facilitate the operation of said control unit.

In one embodiment which may be combined with one or more of the before-addressed embodiments, said N Hall effect devices are positioned on a circle, in particular wherein a plane in which said circle is comprised is perpendicular to said axis. And it is also possible to provide that said N Hall effect devices are uniformly distributed on said circle.

In one embodiment which may be combined with one or more of the before-addressed embodiments, said connections to said input of said filtering-or-resonating unit are accomplished for time periods of the same duration for each of the Hall effect devices, in particular for durations $t_i=Tf/N$, $i=1, \ldots, N$. This can in particular apply in case of the before-addressed position of the N Hall effect devices uniformly distributed over a circle. But it can also be provided that such durations $t_i$ are individually selected for each of the N Hall effect devices.

In one embodiment which may be combined with one or more of the before-addressed embodiments, said successively operationally connecting said N Hall effect devices during said first time period of said duration Tf and in said fixed sequence is carried out repeatedly. Thus, a long-lasting periodic signal can be generated.

In one embodiment which may be combined with one or more of the before-addressed embodiments, the sensor comprises at least one current source comprising an output for outputting an electrical current at its output. This is provided for providing an electric current, commonly referred to as bias current, to the Hall effect devices.

Usually
a direction of flow of the bias current;
a direction along which said Hall voltage is taken; and
said axis;
are all mutually perpendicular to each other.

The application of the bias current can also be accomplished by means of said wiring unit. Thus, the wiring unit would, in this case, also be operationally connected to the respective first pair of connectors of each of said N Hall effect devices.

Usually, said N Hall effect devices are oriented and operated such that they produce a Hall voltage of the same sign in presence of the same magnetic field. It is also possible to provide that the Hall effect devices are oriented and operated such that in presence of the same magnetic field, by each of the N Hall effect devices, a signal of the same sign is inputted to said filtering-or-resonating unit. In that case, also said wiring unit can be operated accordingly, e.g. by suitably applying bias currents to the Hall effect devices, more particularly by applying bias currents in a suitable direction (bias currents having a suitable sign), or by suitably wiring said second contacts.

In one embodiment to be combined with the last-addressed embodiment, the sensor comprises exactly one such current source. But it can also be provided that the sensor comprises exactly two such current sources.

In one embodiment to be combined with one or both of the two last-addressed embodiments, the current outputted by the current source is a predetermined electrical current.

In one embodiment to be combined with one or more of the three last-addressed embodiments, the current outputted by the current source is an adjustable electrical current.

In one embodiment to be combined with one or more of the four last-addressed embodiments, to each of the N Hall effect devices, a bias current of the same amperage is applied.

In one embodiment to be combined with one or more of the five last-addressed embodiments, to each of said N Hall effect device, pulses of constant current are applied.

In one embodiment to be combined with one or more of the six last-addressed embodiments, constant currents are applied during measuring times, i.e. during times when a Hall voltage is fed from the respective Hall effect device to the filtering unit.

Usually, the at least one current source is capable of outputting constant currents, in particular such constant currents which can be used as bias currents.

In one embodiment which may be combined with one or more of the before-addressed embodiments, said fixed sequence is a sequence related to or depending on a relative spatial position of said Hall effect devices. Said fixed sequence can be a sequence derived in dependence of said relative spatial position of said Hall effect devices.

In one embodiment which may be combined with one or more of the before-addressed embodiments, each of said N Hall effect devices is arranged on one corner of a polygon having N corners, wherein said fixed sequence is a sequence which can be obtained by determining for each of said N Hall effect devices an angle enclosed by
- a straight line interconnecting the location of the respective Hall effect device with a center of gravity of said polygon; and
- a straight line interconnecting the location of a first of said N Hall effect devices with the center of gravity of said polygon; and ordering the Hall effect devices according to their respective angles such that said angles constitute a monotonously increasing or monotonously decreasing series. When the Hall effect devices are ordered according either to increasing or to decreasing angles, the before-mentioned staircase signal may have a suitable form for extracting the before-mentioned sine wave.

E.g., if the Hall effect devices are positioned on a circle, a suitable sequence is obtained by starting at an arbitrary first one of the Hall effect devices and then selecting the further Hall effect devices by following the circle (in the one or in the other direction) until the next Hall effect device would be the first one again.

In particular, said polygon can be of such a shape that for all of said N Hall effect devices, on a line segment extending from a center of gravity of said polygon to the respective Hall effect device no further Hall effect device of the N Hall effect devices is located on said line segment.

The specific kinds of fixed sequences explained above mainly apply for N≥3 or rather for N≥4. For N=2, the first and the second Hall effect device are simply alternated. For N=3, any of the two possibilities can be chosen.

Aspects of the invention can also be explained by means of "wiring schemes" which take into account the application of bias currents to the Hall effect devices and the picking-up of Hall voltages from the Hall effect devices. A wiring scheme describes a particular way of wiring both pairs of connectors of a Hall effect device.

Two wiring schemes are referred to as "orthogonal" wiring schemes if, in one of the two wiring schemes, a bias current is applied to a pair of connectors at which, in the other of the two wiring schemes, a Hall voltage is picked up. Provided said filtering-or-resonating unit and said current source are present, one can also say that two wiring schemes are referred to as "orthogonal" wiring schemes if a pair of connectors connected to the current source in one of the two wiring schemes is connected to said filtering-or-resonating unit in the other of the two wiring schemes.

Two wiring schemes are referred to as "reverse" wiring schemes if they lead to different signs of the Hall voltage (in presence of the same magnetic field). This may be accomplished by, e.g., reversing the direction in which the bias current flows or by reversing the polarity with which the Hall voltage is picked up.

E.g., the wiring unit may be operationally connected to each of the connectors of each of said N Hall effect devices and structured and configured for selectively operationally connecting, in particular wiring said pairs of connectors to said output of said current source or to said input of said filtering-or-resonating unit. Therein, it may be provided that a polarity of the connectors of any pair of connectors is selectable (via said control unit controlling said wiring unit).

A wiring of a pair of connectors to said output of said current source usually results in an application of a current (bias current) to the respective Hall device; and a wiring of a pair of connectors to said input of said filtering-or-resonating unit usually results in a Hall voltage being fed to the filtering-or-resonating unit, for processing and finally determining the wanted angular orientation from a phase of the processed (filtered) signal.

In one embodiment which may be combined with one or more of the before-addressed embodiments, said control unit is furthermore structured and configured for controlling said wiring unit in such a way that after said first time period of a duration Tf, the following is accomplished:
during a second time period of a duration Tf, subsequent, in particular successive, to said first time period of a duration Tf, and in the same fixed sequence of said N Hall effect devices, each of said N Hall effect devices is, with its first pair of connectors, successively operationally connected to said input of said filtering-or-resonating unit.

It can thus be provided that for each of said N Hall effect devices, the wiring schemes applied to the respective Hall effect device in said first and second time periods of a duration Tf, respectively, are wiring schemes which are orthogonal with respect to each other. In particular, it can be provided that non-reverse wiring schemes are applied to each of said N Hall effect devices during said first and said second time periods of a duration Tf, respectively, i.e. the respective two wiring schemes applied to each one of the N Hall effect devices are such wiring schemes which lead to identical signs of the Hall voltage.

By combining, after each other, orthogonal (and usually non-reverse) wiring schemes, it is possible to remove or cancel (or at least strongly reduce) offsets. Such an offset in a Hall effect device (which in most cases is inevitably present) means that although no magnetic field is present (B=0), a non-zero Hall voltage is present (VHall≠0).

In a further refinement of the embodiment with the second time period of a duration Tf, it is possible to provide that firstly, for n successive time periods of duration Tf, each of said N Hall effect devices is, in said same fixed sequence of said N Hall effect devices, successively operationally connected with its second pair of connectors to said input of said filtering-or-resonating unit, and successively, for m successive time periods of duration Tf, each of said N Hall effect devices is, in said same fixed sequence of said N Hall effect devices, successively operationally connected with its first pair of connectors to said input of said filtering-or-resonating unit. Therein applies for the integers n and m: n≥1 and more particularly n≥2, and m≥1 and more particularly m≥2. For example, n≥3 and m≥3 such as, e.g., n=m=4 could be chosen. This can result not only in cancelled offsets, but also in reducing frequency components below but close to f=1/Tf, thus resulting in more precise output signals and/or in achieving good output signals with a simpler filtering-or-resonating unit. It can be achieved to simplify the removal of disturbing frequency components below frequency f by replacing such disturbing frequency components by frequency components which are even lower and therewith more distant from frequency f.

Another way of removing offsets which can be combined with one or more of the before-addressed embodiments (and way of removing offsets), can be, e.g., to provide that in said fixed sequence, each of said N Hall effect devices is, first with its first pair and then with its second pair of connectors, successively operationally connected to said input of said filtering-or-resonating unit. In this case, to each of the N Hall effect devices, a first wiring and immediately theraftera second, orthogonal wiring is applied before continuing with the next Hall effect device in the sequence. This can result in moving disturbing frequency components to particularly far above frequency f, which, again, can facilitate the filtering.

It is to be noted that when the term "successive" and "successively", respectively, is used, this usually means that something follows immediately afterwards, i.e. without delay or with negligible delay.

In one embodiment which may be combined with one or more of the before-addressed embodiments in which the sensor comprises said at least one current source, said control unit is furthermore structured and configured for controlling said wiring unit in such a way that after said first time period of a duration Tf, successively, three further orthogonal but non-reverse wiring schemes are applied, in the same fixed sequence, to said N Hall effect devices. This can allow to achieve an excellent compensation of offsets.

In one embodiment which may be combined with one or more of the before-addressed embodiments in which the sensor comprises said at least one current source, said control unit is furthermore structured and configured for controlling said wiring unit in such a way that for at least one of said N Hall effect devices the first pair of connectors of the respective Hall effect device is connected to a current source already before connecting the second pair of connectors of the respective Hall effect device to said input of said filtering-or-resonating unit, wherein this wiring is maintained until and throughout the time during which the second pair of connectors of the respective Hall effect device is connected to said input of said filtering-or-resonating unit; and/or a connection of the first pair of connectors of the respective Hall effect device to a current source is established and maintained throughout and until after termination of the time during which the second pair of connectors of the respective Hall effect device is connected to said input of said filtering-or-resonating unit;

is accomplished;

in particular wherein this applies for each said N Hall effect devices, more particularly wherein both is accomplished for each of said N Hall effect devices. This allows to solve problems arising from switching spikes when connecting a Hall effect device to the current source and when disconnecting a Hall effect device from the current source, respectively. Such connecting/disconnecting may result in current spikes which reflect in the Hall voltage, such that measurement accuracy is diminished. The described embodiment suggests to make (establish) or undo (terminate) the connections of a respective Hall effect device to the at least one current source at a time when no Hall voltage is fed from that respective Hall effect device to the filtering unit, or, more precisely, when no Hall signal of that respective Hall effect device contributes to the output signal. This embodiment results in a need for the at least one current source to produce twice the current required (at minimum) when operating the sensor without the described advanced connection/delayed disconnection, which can be accomplished by a stronger current source or by a providing two current sources.

In one embodiment which may be combined with one or more of the before-addressed embodiments, said control unit is structured and configured for controlling said wiring unit in such a way that during said first time period of a duration Tf and also in a fixed sequence of said N Hall effect devices, each of said N Hall effect devices is, with its second pair of connectors and simultaneously with another one of said N Hall effect devices, successively operationally connected to said input of said filtering-or-resonating unit. In particular, it will be provided that said successive operationally connecting results in feeding to said input of said filtering-or-resonating unit a difference signal related to or derived from a difference of Hall voltages of the respective Hall effect devices simultaneously operationally connected to said input of said filtering-or-resonating unit. This can be accomplished, e.g.: by using a subtracter (to which the connectors of the second pairs are then connected); or by using an adder and connecting the connector of the second pairs accordingly (interchanging connectors inverts the signal); or by directly connecting the second pairs of connectors to the input of the filtering-or-resonating unit such that the respective signals mutually cancel when the respective Hall effect devices experience the same magnetic field.

Said fixed sequence can be the same as the before-mentioned fixed sequence, but then they will be applied in a mutually delayed (shifted) manner.

Such "differential measurements" can result in improved output signals, and an improved overall accuracy can be achievable because various parasitic signals can be removed thereby. If all the N Hall effect devices are located uniformly distributed on a common circle, it can be wise to select those pairs of Hall effect devices which are, with respect to the center of the circle, positioned mutually oppositely as those two Hall effect devices which are (one inversed, one not inversed) simultaneously connected to the input of the filtering-or-resonating unit.

In simple words, it is roughly suggested to feed difference signals of two Hall voltages (of different Hall effect devices) to the filtering-or-resonating unit, and the respective Hall effect device pairs are selected in a fixed sequence.

In one embodiment which may be combined with one or more of the before-addressed embodiments, said output unit comprises a phase detection unit, in particular wherein said output unit comprises in addition a comparator. More particularly, said output unit substantially can consist of a phase detection unit and a comparator or even more specifically of a latch and a comparator and a counter. This is a very simple and cost-effective way of implementing the output unit, in particular an output unit outputting a digital signal. And, in addition, such an output unit responds very fast to inputted signals (filtered signals). In particular, said latch can be a set-reset latch (SR latch).

In one embodiment which may be combined with one or more of the before-addressed embodiments, said control unit is or comprises a logic circuit.

In one embodiment which may be combined with one or more of the before-addressed embodiments, said control unit is (in particular the before-addressed logic circuit is), together with said N Hall effect devices, comprised in one unitary piece of semiconductor material.

In one embodiment which may be combined with one or more of the before-addressed embodiments, said output unit is together with said N Hall effect devices, comprised in one unitary piece of semiconductor material.

In one embodiment which may be combined with one or more of the before-addressed embodiments, said output unit is structured and configured for detecting a phase of said filtered signal, such that the output unit can be considered a phase reading unit.

In one embodiment which may be combined with one or more of the before-addressed embodiments, said output signal is dependent on or derived from a phase of said filtered signal.

In one embodiment which may be combined with one or more of the before-addressed embodiments, said output signal is a PWM signal or a digital signal.

In one embodiment which may be combined with one or more of the before-addressed embodiments, one of or typically each of said N Hall effect devices comprises two or more operationally interconnected Hall effect devices, in particular wherein these are interconnected in series or in parallel. This can provide an improved accuracy. In case of a parallel inter-wiring of more than one Hall effect devices, the Hall effect device will usually comprise an adder, for summing up Hall voltage of the interwired single Hall effect devices.

In one embodiment which may be combined with one or more of the before-addressed embodiments, said connections to said input of said filtering-or-resonating unit are accomplished for time periods of durations ti, i=1, . . . , N, which are chosen so as to be able to obtain, in presence of a time-wise constant magnetic field, at the input of the filtering-or-resonating unit, a staircase signal mimicking a sine-shaped signal of frequency f (mimicking the sine-shaped signal as well as possible, e.g., as estimated by a least-square deviation method). Choosing the times ti suitably can allow to carry out very accurate measurements even in case if unusual (irregular) arrangements of the Hall effect devices.

Note that the described sensors do not require an analog-to-digital converter (ADC). In particular, it it possible to provide that no ADC is comprised in the output unit; and it it possible to provide that no ADC is located in the signal path between the Hall effect devices and the output unit; and it can be provided that no ADC for converting Hall voltages is provided; and it can be provided that no ADC for converting signals obtained from Hall voltages is provided; and it can be provided that no ADC for converting filtered signals is provided.

The method for sensing an angular orientation of a magnet producing a magnetic field comprises the steps of a) providing N≥2 Hall effect devices, each having a detection direction and comprising a first and a second pair of connectors, wherein, in presence of said magnetic field, a flow of an electric current between the connectors of said first pair allows to pick up a Hall voltage between the connectors of the second pair induced by said magnetic field, unless a magnetic field component of said magnetic field along said detection direction is zero, wherein said N Hall effect devices are aligned such that they have a common detection direction lying along an axis;

b) providing a filtering-or-resonating unit comprising an input and structured and configured for altering an inputted signal of a fundamental frequency f=1/Tf, said inputted signal containing, in addition to said fundamental frequency, higher harmonics, in such a way that an intensity of said higher harmonics is decreased relative to an intensity of said fundamental frequency;

d) during a first time period of a duration Tf and in a fixed sequence of said N Hall effect devices: successively operationally connecting each of said N Hall effect devices, with its second pair of connectors, to said input of said filtering-or-resonating unit; and e) deriving from signals outputted by said filtering-or-resonating unit in reaction to carrying out step d) an output signal indicative of said angular orientation.

Typically, step d) is repeatedly carried out

In one embodiment of the method, the method comprises the step of c) providing at least one current source comprising an output and capable of outputting an electrical current at its output.

This is for providing bias currents to the Hall effect devices.

In one embodiment of the method which may be combined with the before-addressed embodiment, a projection of said magnetic field onto said axis is not identical at the positions of all of said N Hall effect devices. Said magnetic field is thus inhomogeneous. The magnetic field at the location of one of said Hall effect devices is different from the magnetic field at the location of at least one other of said Hall effect devices, in particular wherein this applies for respective projections of the magnetic field onto said axis. At least, it shall not be the case that the magnetic field strength (in particular of said projection) at the locations of said Hall effect devices is identical for all angular orientations (rotational positions) of said magnet producing said magnetic field.

In one embodiment of the method which may be combined with one or more of the before-addressed method embodiments, the method comprises the steps of sensing a spatial variation of a projection of a magnetic field vector of said magnetic field onto said axis; and deriving said angular orientation of said magnet from a result of said sensing said spatial variation.

It can be provided that said output signal is also indicative of said spatial variation.

In one embodiment of the method which may be combined with one or more of the before-addressed method embodiments, the method comprises the steps of d') during a second time period of a duration Tf subsequent, in particular successive, to said first time period of duration Tf, and in the same fixed sequence of said N Hall effect devices: successively operationally connecting each of said N Hall effect devices, with its first pair of connectors, to said input of said filtering-or-resonating unit.

This and other ways of removing offsets have also already been discussed above for the sensor.

In one embodiment of the method which may be combined with one or more of the before-addressed method embodiments, the method comprises carrying out for at least one of said N Hall effect devices at least one of the steps of f1) operationally connecting the first pair of connectors of the respective Hall effect device to a current source already before operationally connecting the second pair of connectors of the respective Hall effect device to said input of said filtering-or-resonating unit and maintaining this wiring until and throughout the time during which said second pair of connectors of the respective Hall effect device is operationally connected to said input of said filtering-or-resonating unit;

f2) operationally connecting the first pair of connectors of the respective Hall effect device to a current source and maintaining this wiring throughout and until after termination of the time during which the second pair of connectors of the respective Hall effect device is operationally connected to said input of said filtering-or-resonating unit.

In particular at least one of said steps f1) and f2) can be carried out for each said N Hall effect devices, more particularly wherein both said steps f1) and f2) are carried out for each of said N Hall effect devices.

This way of avoiding switching spikes has also already been discussed above for the sensor.

In one embodiment of the method which may be combined with one or more of the before-addressed method embodiments, the method comprises the step of d3) during said first time period of a duration Tf and also in a fixed sequence of said N Hall effect devices: successively operationally connecting each of said N Hall effect devices simultaneously with another one of said N Hall effect devices, with its second pair of connectors, to said input of said filtering-or-resonating unit.

In particular, it will be provided that said successive operationally connecting results in feeding to said input of said filtering-or-resonating unit a difference signal related to or derived from a difference of Hall voltages of the respective Hall effect devices simultaneously operationally connected to said input of said filtering-or-resonating unit.

This allows to carry out "differential measurements".

A "differential measurement" can also be accomplished in another method embodiment. In this embodiment of the method which may be combined with one or more of the other before-addressed method embodiments, the method comprises the step of a2) providing a second set of N≥2 Hall effect devices, each having a detection direction and comprising a first and a second pair of connectors, wherein, in presence of said magnetic field, a flow of an electric current between the connectors of said first pair allows to pick up a Hall voltage between the connectors of the second pair induced by said magnetic field, unless a magnetic field component of said magnetic field along said detection direction is zero, wherein said N Hall effect devices are aligned such that they have a common detection direction lying along an axis;

d2) during said first time period of a duration Tf and in a fixed sequence of said N Hall effect devices of said second set of Hall effect devices: successively operationally connecting each of said N Hall effect devices of said second set of Hall effect devices, with its second pair of connectors, to said input of said filtering-or-resonating unit;

wherein steps d) and d2) are carried out in such a way that a difference signal related to or derived from a difference of Hall voltages of the respective Hall effect devices of the two sets of N Hall effect devices is fed to said input of said filtering-or-resonating unit.

In one embodiment of the method which may be combined with one or more of the before-addressed method embodiments, the method comprises the step of g) obtaining from said output signal a signal indicative of or derivable from a variation in time of said angular orientation.

Generally, the invention comprises methods with corresponding features of corresponding sensors according to the invention, and sensors with corresponding features of corresponding methods according to the invention.

The advantages of the methods basically correspond to the advantages of corresponding apparatuses and vice versa.

The method (and, correspondingly also the sensor) can find various applications and may thus be used for various purposes, e.g., for at least one of determining an angular position of a rotatable body comprising said magnet;

determining a rotational speed of a rotating body comprising said magnet;

determining a change in rotational speed of a rotating body comprising said magnet;

determining a number of revolutions of a rotatable body that have taken place from an initial point in time.

The invention furthermore comprises an integrated circuit comprising at least one sensor according to one of the invention, in particular wherein said integrated circuit is manufactured using CMOS processes. As has been indicated above, it is possible to manufacture the complete sensor in one piece of semiconductor material, e.g., of silicon. In particular, the sensor can be manufactured in CMOS technology.

The invention furthermore comprises a device or arrangement. That device or arrangement comprises a sensor according to the invention or an integrated circuit according to the invention.

In one embodiment of the device or arrangement, the device or arrangement is at least one of an angular position sensor;
a rotary encoder;
a rotation speed sensor;
a revolution counter;
an electric motor.

In case of said electric motor, the electric motor can in particular be a brushless or electronically commutated motor or an electronically controlled electric motor.

In one embodiment of the device or arrangement which may be combined with the last-addressed embodiment, the device or arrangement comprises said magnet. Said magnet can in particular be a permanent magnet. Even more particularly, said magnet can have a cylinder or cylinder ring shape, more specifically wherein a magnetization of the magnet is directed along a diameter of the cylinder or cylinder ring.

In one embodiment of the device or arrangement which may be combined with one or both of the two before-addressed device-or-arrangement embodiments, the device or arrangement comprises a rotatable body, in particular a rotatable body to which said magnet is fixed. In many application cases, a property of a rotatable body (such as a rotor of an electric motor), e.g., its speed of rotation, is to be determined, usually by means of the sensor or the method.

In one embodiment of the device or arrangement which may be combined with one or more of the before-addressed device-or-arrangement embodiments, the device or arrangement comprises a fixing relative to which said sensor is fixed, and in particular, e.g., to which a magnet or a rotatable body like the before-mentioned ones can be (rotatably) fixed.

In one embodiment of the device or arrangement which may be combined with one or more of the before-addressed device-or-arrangement embodiments, the device or arrangement comprises a housing to which said sensor is fixed and/or to which a bearing is fixed, e.g., for supporting a rotatable body like the before-mentioned one.

In one embodiment of the device or arrangement which may be combined with one or more of the before-addressed device-or-arrangement embodiments, said magnet is tiltable or rotatable about a rotation axis aligned along (i.e. parallel to) the before-mentioned axis, and all of said N Hall effect devices are located in one and the same half-space defined by a plane comprising said rotation axis. This way, an off-axis configuration of the device or arrangement can be realized. Off-axis configurations can be particularly useful in cases where space in direction along the rotation axis is scarce. And, their use can also be indicated when the magnet has a cylindrical or rotational symmetry and radially oriented magnetisation, namely for ensuring time-varying Hall voltages at the Hall effect devices when the magnet (and thus usually also the magnetic field) rotates or is tilted.

In one embodiment of the device or arrangement which may be combined with one or more of the before-addressed device-or-arrangement embodiments, the N Hall effect devices are arranged such that an imaginary plane aligned parallel to said axis can be inserted between said magnet and said N Hall effect devices, in particular wherein this applies in any possible rotational (or angular) position of the magnet. This way, another off-axis configuration can be realized.

In one embodiment of the device or arrangement which may be combined with one or more of the before-addressed device-or-arrangement embodiments in which the magnet is provided, said magnet is tiltable or rotatable about a rotation axis aligned along the before-mentioned axis, and all of said N Hall effect devices are distanced farther from said rotation axis than a portion of said magnet distanced farthest from said axis. This way, an off-axis configuration can be realized.

In one embodiment of the device or arrangement which may be combined with one or more of the before-addressed device-or-arrangement embodiments in which a rotatable body is provided, the N Hall effect devices are arranged such that an imaginary plane aligned parallel to said axis can be inserted between said rotatable body and said N Hall effect devices, in particular wherein this applies in any possible rotational (or angular) position of the rotatable body.

Alternatively to off-axis configurations, on-axis configurations may be chosen. An on-axis configuration can be present when, e.g., a center of gravity of the locations of the N Hall effect devices is located on an axis of rotation (of said magnet or of a rotatable body).

In one embodiment of the device or arrangement which may be combined with one or more of the before-addressed device-or-arrangement embodiments in which said magnet is provided, all the N Hall effect devices are located, with respect to a coordinate parallel to said axis, on one and the same side of said magnet and distanced therefrom.

In one embodiment of the device or arrangement which may be combined with one or more of the before-addressed device-or-arrangement embodiments in which said rotatable body is provided, all the N Hall effect devices are located, with respect to a coordinate parallel to said axis, on one and the same side of said rotatable body and distanced therefrom.

In one embodiment of the device or arrangement which may be combined with one or more of the before-addressed device-or-arrangement embodiments, the device or arrangement comprises an evaluation unit operationally connected to said output unit. In particular, said evaluation unit can be structured and configured for obtaining from said output signal a signal indicative of or derived from a variation in time of said angular orientation. More particularly, said evaluation unit can be configured for obtaining at least one of
- a signal indicative of said angular orientation;
- a signal indicative of a speed of said variation of said angular orientation;
- a signal indicative of a frequency with which said angular orientation varies;
- a signal indicative of a number of revolutions of said magnet that have taken place from an initial point in time;
- a signal indicative of at least one of
  - an angular or rotational orientation of a rotatable body;
  - a speed of variation of an angular or rotational orientation of a rotatable body;
  - a frequency with which an angular orientation or rotational of a rotatable body varies;
  - a number of revolutions of a rotatable body having taken place from an initial point in time.

In particular, it can be provided that said magnet is fixed to said rotatable body. And it can be provided that said rotatable body is rotatable about a rotation axis aligned along said axis. It can also be provided that said evaluation unit comprises a counter.

The invention can furthermore comprise a method for manufacturing a sensor for sensing an angular orientation of a magnet producing a magnetic field, said method comprising manufacturing in a single piece of semiconductor material
- N≥2 Hall effect devices, each having a detection direction and comprising a first and a second pair of connectors, wherein, in presence of said magnetic field, a flow of an electric current between the connectors of said first pair allows to pick up a Hall voltage between the connectors of the second pair induced by said magnetic field, unless a magnetic field component of said magnetic field along said detection direction is zero, wherein said N Hall effect devices are aligned such that they have a common detection direction lying along an axis;
- a filtering-or-resonating unit comprising an input and an output, wherein a signal outputted from said output is referred to as filtered signal;
- a wiring unit operationally connected to the respective second pair of connectors of each of said N Hall effect devices;
- a control unit structured and configured for controlling said wiring unit;
- an output unit operationally connected to said output of said filtering-or-resonating unit;

wherein said filtering-or-resonating unit is a filter or resonator having a fundamental frequency f=1/Tf.

In particular, the wiring unit can be structured and configured for selectively operationally connecting, in particular wiring the connectors of said second pairs to said input of said filtering-or-resonating unit.

The control unit can in particular be structured and configured for controlling said wiring unit in such a way that during a first time period of a duration Tf and in a fixed sequence of said N Hall effect devices, each of said N Hall effect devices is, with its second pair of connectors, successively operationally connected to said input of said filtering-or-resonating unit.

It can, in particular be provided that the output unit is structured and configured for obtaining from a filtered signal an output signal related to said angular orientation and for outputting said output signal.

The filtering-or-resonating unit can in particular be structured and configured for altering an inputted signal of a fundamental frequency f=1/Tf, said inputted signal containing, in addition to said fundamental frequency, higher harmonics, in such a way that an intensity of said higher harmonics is decreased relative to an intensity of said fundamental frequency.

Generally, the manufactured sensor can be a sensor of a kind described anywhere in the present patent application.

In one embodiment of the manufacturing method, the method comprises manufacturing in said single piece of semiconductor material at least one of
- a band pass filter realizing or comprised in said filtering-or-resonating unit;
- a multiplexer realizing or comprised in said wiring unit;
- an electronic circuit (e.g., a logic circuit) realizing or comprised in said control unit;
- a phase detection unit realizing or comprised in said output unit, in particular a latch and a comparator and a counter realizing or comprised in said output unit.

Further embodiments and advantages emerge from the dependent claims and the figures.

BRIEF DESCRIPTION OF THE DRAWINGS

Below, the invention is described in more detail by means of examples and the included drawings. The figures show schematically:

FIG. 6 an illustration of a detail of an arrangement comprising a sensor with ten Hall effect devices, in a top view;

FIG. 7 an illustration of a detail of the arrangement of FIG. 6, in a perspective view;

FIG. 14 an illustration of a detail of an arrangement in an off-axis configuration, in a perspective view;

The described embodiments are meant as examples and shall not confine the invention.

DETAILED DESCRIPTION OF THE INVENTION

Figure 1:
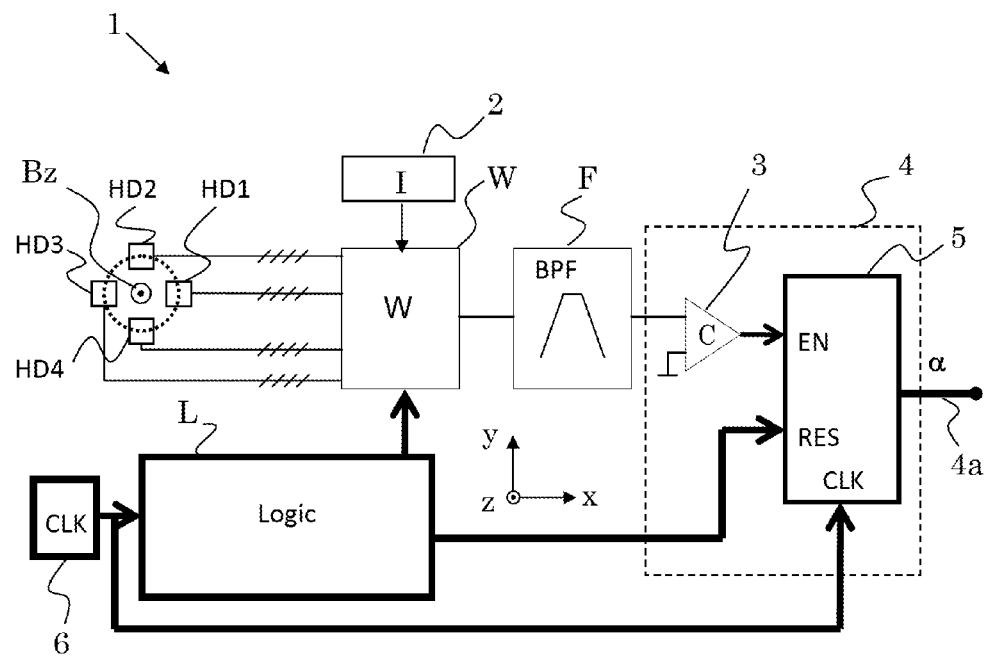
FIG. 1 a schematic block-diagrammatical illustration of a sensor.

FIG. 1 shows schematic block-diagrammatical illustration of a sensor 1 for sensing an angular orientation of a magnet producing a magnetic field comprising a component Bz along a coordinate z perpendicular to the drawing plane, wherein said angular orientation is described by an angle α. Sensor 1 comprises four Hall effect devices HD1, HD2, HD3, HD4. The devices HD1, HD2, HD3, HD4 are Hall plate devices, with their respective detection directions lying along the z coordinate. The devices HD1, HD2, HD3, HD4 are arranged in one common plane, on a circle and have two pairs of connectors each. For sensing an angular orientation, a bias current is applied to a device via the one pair of connectors, and the resulting Hall voltage is detected via the other pair of connectors.

The devices HD1, HD2, HD3, HD4 are operationally connected to a wiring unit W which is controlled by a control unit L. Wiring unit W applies wiring schemes to the devices HD1, HD2, HD3, HD4 which determine which of the pairs of connectors is used for applying the bias current, and which for picking up the Hall voltage. And also the polarity if bias current and Hall voltage, respectively can be selected by means of wiring unit W. Accordingly, the sensor 1 can comprise a current source 2 operationally connected to wiring unit W.

Wiring unit W is furthermore operationally connected to a filtering unit F which is, in the embodiment of FIG. 1 embodied as a band pass filter, so as to filter the Hall voltage signals obtained via wiring unit W from the Hall effect devices HD1, HD2, HD3, HD4.

The filtered signals outputted by filtering unit F are fed into one input of a comparator 3, the other input of comparator 3 being connected to ground potential. The signal outputted by the comparator 3 is a digital signal (digital signals are drawn as bold arrows, analogue signals are drawn as thin lines), and the phase thereof can be detected in a way known in the art. For detecting the phase, e.g., a phase detection unit 5 like depicted in FIG. 1 can be used. Phase detection unit 5 is fed with the signal outputted by the comparator 3 (which is a PWM—Pulse Width Moduldation—signal), a signal outputted by control unit L (usually a square signal) and a clock signal outputted by clock 6. Comparator 3 and phase detection unit 5 are constituents of an output unit 4 of the sensor 1. A signal indicative of the sought angular orientation is outputted at output 4a of output unit 4 ("output signal"). Clock 6 can, e.g., produce itself a clock signal or merely receive and pass on a clock signal.

Figure 10:
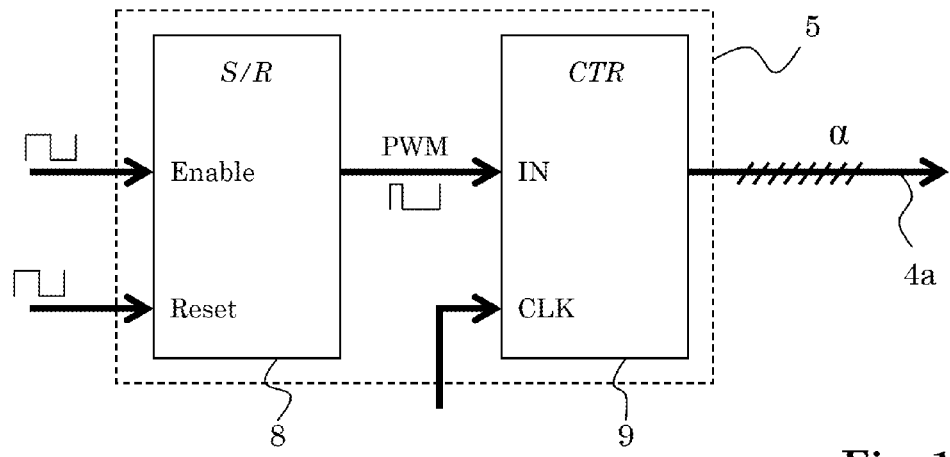
FIG. 10 a block-diagrammatical illustration of a phase detection unit.

An exemplary phase detection unit 5 as it could be used in the embodiment of FIG. 1 is block-diagrammatically illustrated in more detail in FIG. 10. Phase detection unit 5 comprises a set-reset latch 8 (SR-latch) and a counter 9. Logic signals from comparator 3 and control unit L, respectively, are inputted to the two inputs of latch 8, e.g., the signal from comparator 3 is inputted to a set (or enable) input of latch 8, so as to trigger the on-state (or high state), and the signal from control unit L is inputted to a reset input of latch 8, so as to trigger the off-state (or idle state), or vice versa. Both inputted logic signals have the same frequency, but their relative phase depends on (and may even represent) the sought angle α. As a result, a PWM signal having a duty cycle representative of the relative phase of the two inputted logic signals and thus possibly also representative of the sought angle α is outputted. The PWM signal outputted by latch 8 is fed into counter 9 which in addition is provided with the clock signal (cf. FIG. 1) having a much higher frequency, e.g. three or four orders of magnitude higher than the before-mentioned PWM signal, depending on the desired resolution. Counter 9 outputs output signals 4a, e.g., like sketched in FIG. 10, an eight-bit signal representative of the sought angle α. As mentioned before, other phase detection principles and implementations and in general, other output units 4, may be used.

Figure 2:
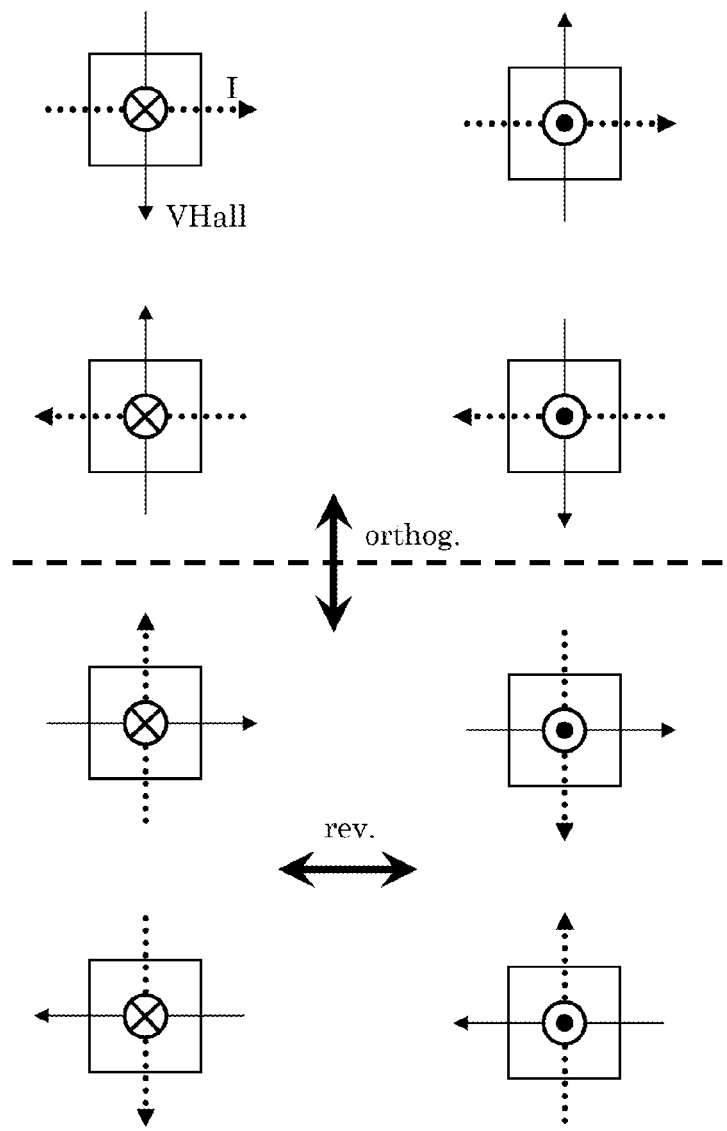
FIG. 2 a symbolic illustration of all possible wiring schemes of a Hall effect device.

FIG. 2 is a schematic symbolic illustration of all possible schemes of a Hall effect device. The eight wiring schemes applicable to a Hall effect device are illustrated. In FIG. 2, a Hall effect device is symbolized by a square, the direction of flow of a bias current I is symbolized by a thin arrow, and the direction of detection of a Hall voltage VHall is symbolized by a dotted arrow. These "directions" correspond of course merely to a way of wiring the Hall effect device, i.e. of making connections to the connectors of the Hall effect device. The detection direction of the Hall effect device is perpendicular to the drawing plane, and the symbol in the middle of a Hall effect device indicates whether two wiring schemes result in a Hall voltage of the same or of opposite sign.

Those wiring schemes on the left hand side in FIG. 2 all result in the same sign of VHall, and accordingly, these wiring schemes are not reverse wiring schemes. The same applies to the wiring schemes on the right hand side of FIG. 2. But any wiring scheme on the left is a reverse wiring scheme of any wiring scheme on the right in FIG. 2.

Furthermore, any wiring scheme in the top half of FIG. 2 is orthogonal to any wiring scheme in the bottom half of FIG. 2, since the pair of connectors at which the bias current I is applied to a Hall effect device in the top half of FIG. 2 is used for outputting VHall at a Hall effect device in the bottom half of FIG. 2 and vice versa.

Figure 3:
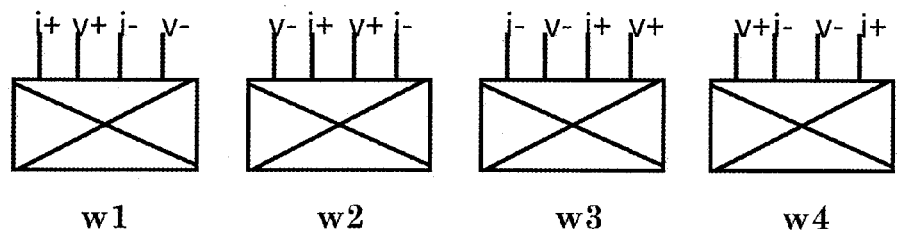
FIG. 3 a schematic symbolic illustration of four non-reverse wiring schemes of Hall effect device.

FIG. 3 illustrates four non-reverse wiring schemes w1, w2, w3, w4 of a Hall effect device (symbolized as a crossed box) in a way slightly different from FIG. 2. The letters i and v indicate connectors connected for bias current application and Hall voltage detection, respectively, and the "+" and "−" indicate the polarization (or "direction", cf. above). The corresponding reverse wiring schemes can be obtained by crossing the output connectors of the Hall effect device, i.e. by replacing v+ by v− and v− by v+ in FIG. 3; these (reverse) wiring schemes will be indicated by adding a minus, i.e. by −w1, −w2, −w3, −w4.

Figure 4:
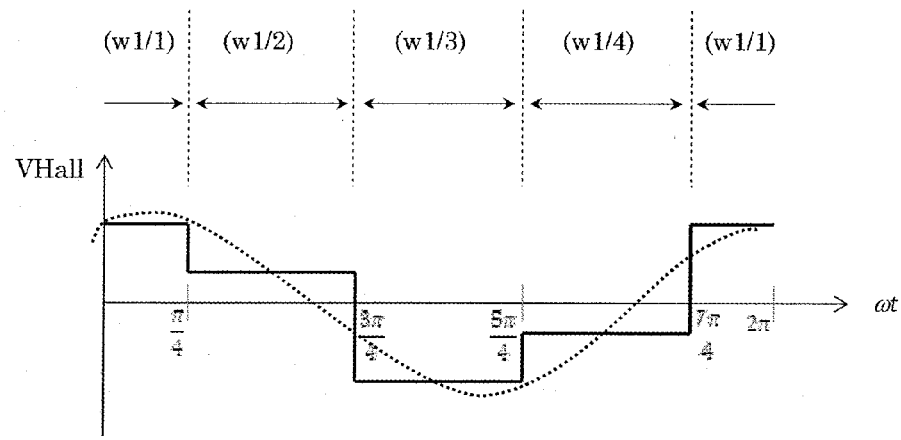
FIG. 4 an illustration of signals.

FIG. 4 shall assist the understanding of the way of functioning of the sensor 1 of FIG. 1 and shows an illustration of Hall voltages VHall resulting when applying bias currents to the Hall effect devices HD1, HD2, HD3, HD4 of FIG. 1, and in particular the time development thereof. Therein, it is referred to the wiring schemes illustrated in FIG. 3, wherein a wiring scheme number p applied to Hall device number q will be referred to with wp/q. The bias current applied to a Hall effect device is kept constant while feeding the corresponding Hall voltage signal to filtering unit F, and, accordingly, the bias current is applied to the Hall effect devices in form of (rectangular) current pulses, i.e. of pulses of constant current.

Wiring unit W firstly applies wiring scheme w1/1, then w1/2, then w1/3 and then w1/4. Thereafter, the same sequence of wiring schemes will be repeated again and again. In other words, a constant current I drawn from current source 2 will be alternately applied to devices HD1, HD2, HD3, HD4, and simultaneously, the respective device to which the bias current I is applied is connected with its other pair of connectors to filtering unit F. Therein, always the same wiring scheme (w1) is applied, but successively to each of the Hall effect devices. The Hall voltages entering filtering unit F describe a step function (drawn in solid lines in FIG. 4). The filtered signals outputted by filtering unit F are drawn as a dotted line in FIG. 4. In FIG. 4, wt indicates the angle in radiant.

Filtering unit F has a fundamental frequency f corresponding to a period Tf=1/f, wherein Tf corresponds to $2\pi$ in FIG. 4. The wiring scheme is applied for Tf/4 to a Hall device before changing the wiring to the next Hall device. Clock 6, together with control unit L, is operated accordingly.

The sequence (or order in time) in which the Hall effect devices are connected to the filtering unit F are chosen in such a way that in a first half-period of Tf/2, the devices HD1 and HD2 generate a Hall voltage of the same sign, and in a subsequently following second half-period of Tf/2, the devices HD3 and HD4 generate a Hall voltage of the same sign which is opposite to the sign in the first half-period. This order or sequence is also readily obtained when starting with a first device, e.g., HD1, and following the circle (cf. FIG. 1, dotted circle) along which the devices are arranged (in uniform distances).

This results, at least for usual configurations (cf., e.g., FIGS. 6, 7, 12, 14, 15) in a filtered signal having the fundamental frequency f=1/Tf and being substantially sine-shaped, wherein the phase of the filtered signal is indicative of the angle α describing the angular orientation a magnet producing the magnetic field detected. In fact, said angular orientation of the magnet is sensed via sensing a spatial variation of a projection of the magnetic field (more precisely: of the magnetic field vector) onto the z axis.

Comparing the filtered signal with ground potential in comparator 3 results in a digital signal (more particularly in a square signal), and by means of this digital signal and the clock signal outputted by clock 6 and the logic signal (typically a square signal) outputted by control unit L, phase detection unit 5 (cf. also FIG. 10) can output a digital signal not only indicative of the angle α describing the orientation of the magnet to be detected but directly indicating that sought angle.

FIGS. 6 and 7 are illustrations of a detail of an arrangement comprising a sensor with ten Hall effect devices, in a top view and in a perspective view, respectively. The arrangement comprises a magnet M producing the magnetic field, typically a permanent magnet (but electromagnets may also be used), and a rotatable body b which, e.g., can be rod-shaped. Body b is rotatable or at least tiltable about a rotation axis A aligned along the z coordinate. It can be, e.g., a rotor of an electric motor. In reality, the sensor and the arrangement of Hall effect devices would be much smaller relative to magnet M and rotatable body b than illustrated in FIGS. 6 and 7.

The arrangement illustrated in FIGS. 6 and 7, which could also be a device such as an electric motor with integrated rotary encoder, has an on-axis configuration. Therein, the Hall effect devices are (along the z coordinate and thus parallel to the rotation axis A) distant from an end of the rotatable body b and the magnet M. The center point of the circle on which the Hall effect devices are arranged lies on rotation axis A. In the very unusual case that the magnetic field of magnet M had a rotational symmetry (about axis A), e.g., magnet M being an axially polarized magnet, the arrangement of Hall effect devices would rather be located in a position shifted away from axis A, introducing an asymmetry (off-axis configuration).

In an arrangement or device, the sensor can be fixed at or at least with respect to a housing, e.g., a housing housing said rotatable body and/or said magnet.

Figure 12:
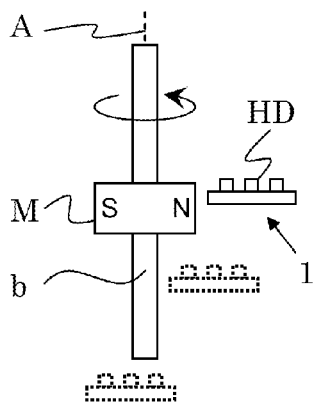
FIG. 12 an illustration of an arrangement in off-axis configuration, in a side view.

FIG. 12 is an illustration of an arrangement in off-axis configuration, in a side view. The sensor 1 is positioned aside magnet M of radially oriented magnetization. This can be advantageous if space along axis A is scarce or not available for positioning a sensor. In dotted lines are sketched two sensors in alternative off-axis positions; one is located aside rotatable body b, closer to axis A than the sensor 1 drawn in solid lines. The other one is arranged in an asymmetric position beyond the axial extension (along z) of body b. Off-axis configurations will be discussed below in conjunction with FIGS. 14, 15 and 16.

Coming back to the signals (cf. FIGS. 1 and 10), usually, all three of the following signals, the one from the comparator 3, the one from control unit L, and the one fed from latch 8 to counter 9, have the same frequency, namely the before-mentioned frequency f.

Of course, other ways of evaluating the filtered signal are thinkable, in particular dispensing with comparator 3 and/or with latch 8 and/or counter 9. But such ways will usually be more complicated and/or slower.

When the connections to the current source 2 are established simultaneously with the connections to the filtering unit F, current spikes and corresponding Hall voltage spikes can occur (not shown in FIG. 4), in particular when initiating the connections, but also when breaking the connections.

Figure 5:
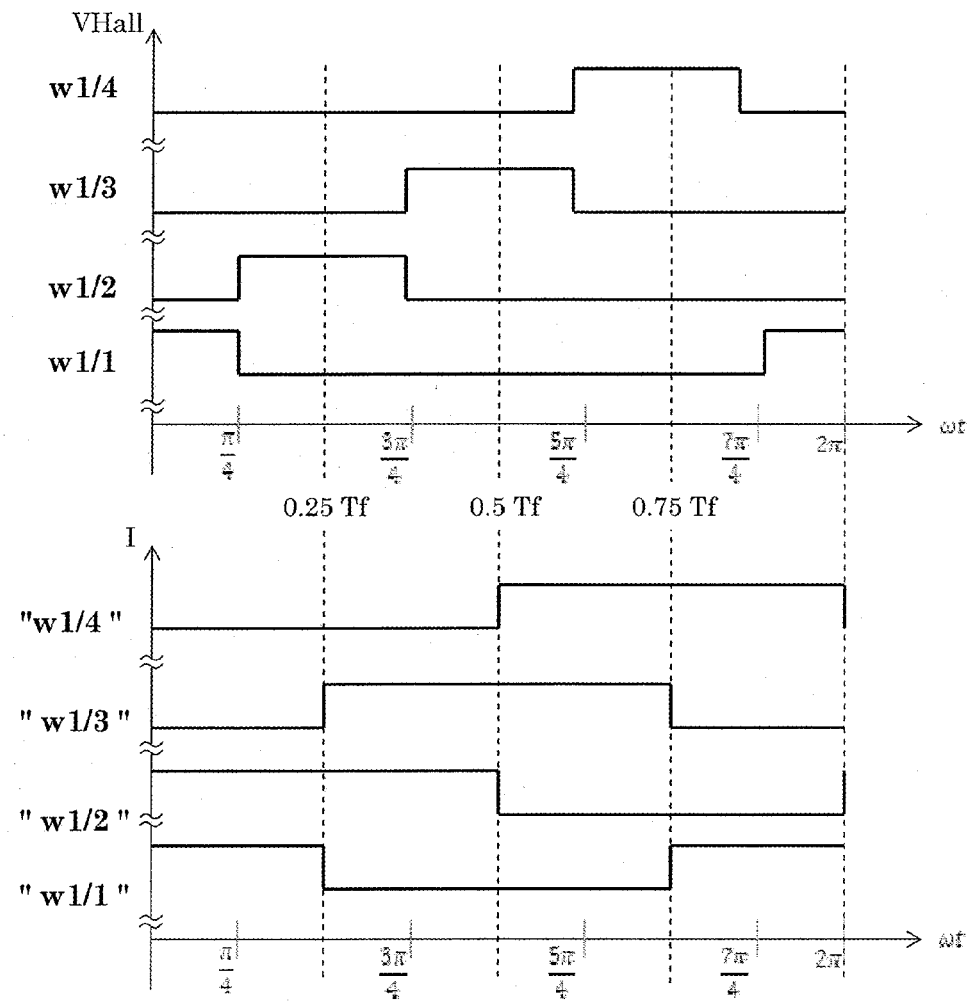
FIG. 5 an illustration of applied bias currents and resulting Hall voltages.

Such spikes in the voltage signals fed to filtering unit F result in inaccuracies of the detected angle α. In order to avoid such problems, it is possible to establish the connections of the devices HD1, HD2, HD3, HD4 to the current source 2 already before the connections to the filtering unit F are made and/or to disconnect the current source 2 from the respective Hall effect device after the connections of that Hall effect device to the filtering unit F are broken. Accordingly, there are times when two times the bias current I is drawn. This of course requires that current source 2 can simultaneously provide two times the bias current I, or that a second current source is provided. FIG. 5 shows an illustration of applied bias currents I and resulting Hall voltages VHall suitable for accomplishing the above-described procedure for suppressing spikes and thus improving measuring accuracy, in particular the time development of I and VHall is shown. In the lower part of FIG. 5 where the applied currents I are shown, the indicated wiring schemes for HD1 to HD4 are put in quotes because the full wiring scheme (comprising the connections of both pairs of connectors) is of course only present during that portion of time during which also the other pair of connectors is properly connected, namely to the filtering unit F.

Reading example for FIG. 5: Whereas for HD2 the connections to filtering unit F according to wiring scheme w1 are present from $\pi/4$ to $3\pi/4$ (upper portion of FIG. 5) only, the connections to current source 2 according to wiring scheme w1 are present from 0 to $\pi/2$ (lower portion of FIG. 5). In this case, the connections for applying the bias current I are established and broken a duration of Tf/8 (corresponding to n/4) earlier and later, respectively than the connections to filtering unit F; they are present twice as long as the connections to filtering unit F are present and centered about the time the connections to filtering unit F are present.

Another possible improvement which allows to achieve an excellent offset cancellation makes use of not only one wiring schemes (in each Hall effect device), but of two.

Figure 13:
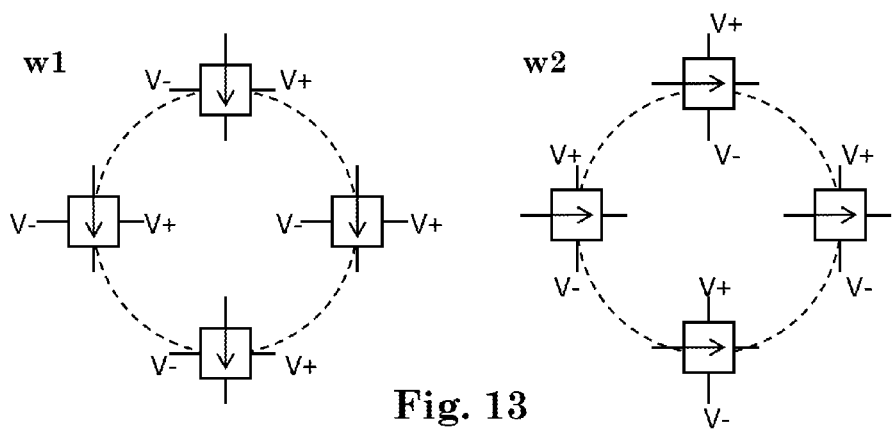
FIG. 13 an illustration of wiring schemes for offset compensation.

The repeating wiring sequence in this case has a length of not only Tf, but of 2Tf. During the first period of length Tf, the same sequence as illustrated in FIG. 4 can be used, i.e. w1/1, w1/2, w1/3, w1/4. But in the second period of length Tf, the sequence w2/1, w2/2, w2/3, w2/4 is applied (cf. FIG. 3). Wiring scheme w2 is orthogonal and non-reverse to wiring scheme w1. Also other orthogonal and non-reverse to wiring schemes may be applied in the two successive periods of length Tf. FIG. 13 is an illustration of these wiring schemes successively (and finally alternatively) used for offset compensation. The filtered signal is then an average between the first and the second period of length Tf.

Of course, this embodiment can be also combined with the embodiment illustrated in FIG. 5.

Yet another possible improvement which allows to achieve an excellent offset cancellation even in case of strongly nonlinear Hall effect devices makes use of not only one or two wiring schemes (in each Hall effect device), but of four.

The repeating wiring sequence in this case has a length of not only Tf, but of 4Tf. Again, during the first period of length Tf, the same sequence as illustrated in FIG. 4 can be used, i.e. w1/1, w1/2, w1/3, w1/4. But, like in the embodiment above, in the second period of length Tf, the sequence w2/1, w2/2, w2/3, w2/4 is applied (cf. FIG. 3). In the third period of length Tf, the sequence w3/1, w3/2, w3/3, w3/4 is applied (cf. FIG. 3).

And, finally, in the fourth period of length Tf, the sequence w4/1, w4/2, w4/3, w4/4 is applied (cf. FIG. 3). All the wiring schemes w1, w2, w3, w4 are mutually orthogonal and non-reverse.

The filtered signal is then an average between the four successive periods of length Tf.

Of course, this embodiment can be also combined with the embodiment illustrated in FIG. 5.

Note that periodicities of 2 Tf and 4 Tf, respectively, as they occur in the before-described embodiments, may introduce corresponding frequency components of f/2 and f/4, respectively, in the signals fed to filtering unit F. Using a suitable band pass filter or another filtering unit comprising a highpass filter can efficiently remove such low frequency components. Thus, no effects detrimental to the accuracy of the output signals need to occur.

In another special embodiment which is particularly suitable when the magnet is rotating (creating varying spatial variations at the locations of the Hall effect devices), the filtering unit substantially is a band pass filter, in particular one having a quality factor Q of preferably about $\pi/2$.

Of course, all the concepts described above do not only work with 4 or 8 or 10 Hall effect devices. And the devices do not necessarily have to be arranged in a common plane and/or on a circle, even though at least the first will usually be the case. It is also possible to use as little as two or to use three, or more devices and apply the same ideas as addressed above. But in any case with four or more devices, it is advisable to carefully select the order (sequence) in which Hall voltages are fed from the respective Hall effect device to the filtering unit. And, in addition, e.g., if the mutual arrangement of the Hall effect devices is not as regularly spaced as in the illustrated cases, it is advisable to carefully adjust the time durations during which each respective Hall effect device feeds its Hall voltage to filtering unit F.

Both, order (sequence) and times shall be chosen such that the staircase signal fed to the filtering unit mimics (as close as possible) a sine signal of frequency f=1/Tf.

FIG. 14 is an illustration of a detail of an arrangement in an off-axis configuration, in a perspective view.

FIG. 14 is an illustration of a detail of an arrangement in an off-axis configuration, in a perspective view. The magnet M has a cylinder ring shape and a radially oriented magnetization vector. If the Hall effect devices HD were arranged on a circle having a center coinciding with rotation axis A and lying in a plane perpendicular to axis A, all Hall effect devices HD would, irrespective of an angular orientation (rotational position) of magnet M, produce substantially the same Hall voltage (provided the same bias current would be applied as usually is the case). Therefore, a shift of the Hall effect device arrangement in a radial direction is indicated in order to produce a periodic signal at the output of the wiring unit.

Figure 15:
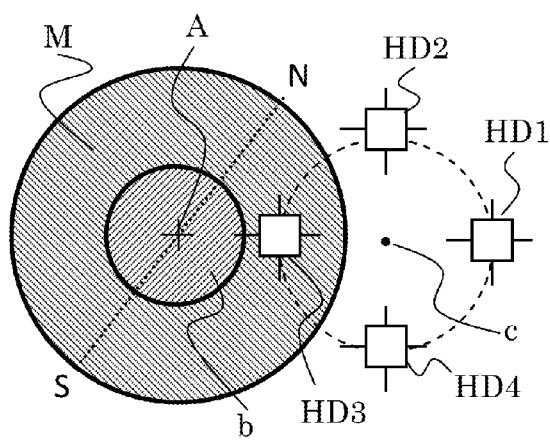
FIG. 15 an illustration of a detail of an arrangement in an off-axis configuration, in a sectional view.

FIG. 15 is an illustration of a detail of another arrangement in an off-axis configuration. Again, it is assumed that the Hall effect devices are on a circle in a plane perpendicular to the rotation axis A. The center of gravity c of the locations of the Hall effect devices (corresponding, in case of the illustrated circular arrangement of Hall effect devices to the center point of the circle) is off-axis with respect to rotation axis A.

Figure 16:
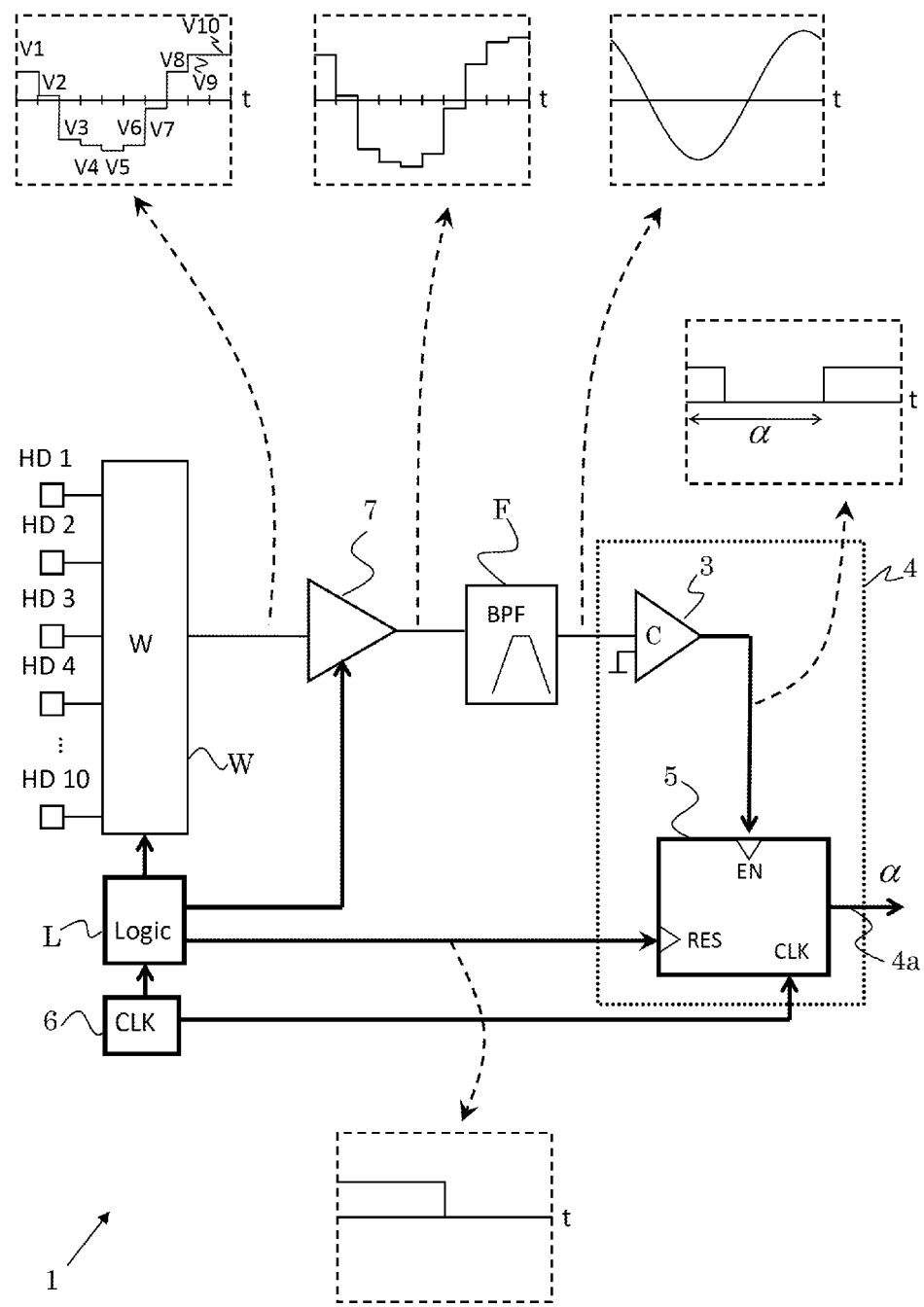
FIG. 16 a schematic block-diagrammatical illustration of a sensor including illustrations of signals.

Whereas in other configurations such as in FIGS. 6 and 7, the output signals correspond, without further adjustments, to the sought angle $\alpha$, in case of an arrangement like in FIG. 14 or 15, usually, additional measures have to be taken in order to achieve this. One possibility would be to adjust bias currents individually for the Hall effect devices. Another possibility is to adjust time durations during which a respective Hall effect device supplies its Hall voltage to filtering unit F individually for the Hall effect devices. This can be cumbersome and is possible only in steps (time steps) given by the pulse of clock 6. Yet another measure that can be taken for producing output signals providing a high accuracy and being simply interpretable, is to provide a modulatable amplifier between wiring unit W and filtering unit F. FIG. 16 illustrates this.

FIG. 16 is a schematic block-diagrammatical illustration of a sensor 1 and includes illustrations of signals. The sensor is illustrated in the same manner as the sensor of FIG. 1 and can be configured in an arrangement like illustrated in FIG. 14. Ten Hall effect devices are assumed to be provided. The bent dashed arrows designate an illustration of an exemplary signal flowing in the respective line.

The signal outputted from wiring unit W is a staircase signal close to approximating a sine wave (of some phase). It basically is a concatenation of the Hall voltages V1, V2, ... V10 outputted from the respective Hall effect devices HD1, HD2, ... HD10.

Due to the off-axis configuration in conjunction with the magnetic field of the cylinder-ring shaped magnet of radial magnetization, the magnetic field component along the z-axis (parallel to the axis of rotation and perpendicular to the plane in which the Hall effect devices are located) experienced by the Hall effect devices is different for those Hall effect devices closer to axis A and those more distant from axis A.

In order to compensate for this, a controllable or modulatable amplifier 7 is provided between wiring unit W and filtering unit F. Controlled by control unit L, it can vary the amplification individually for each Hall effect device. Thus, the signal outputted by amplifier 7 is more closely mimicking a sine-shaped wave. The period of that signal is Tf.

After having passed through filtering unit F embodied as a band pass filter of fundamental frequency f=1/Tf, the signal is a sine-shaped signal (or at least a signal closely resembling the latter). At the output of grounded comparator 3, the illustrated digital signal is outputted to phase detection unit 5. The signal outputted from control unit L to phase detection unit 5 is another digital signal as illustrated.

The amplification factors (or correction factors) to be applied to the Hall voltages of the individual Hall effect devices strongly depend on the magnet and magnetic field and on the relative position and alignment of magnet and the respective Hall effect device. Suitable factors can be obtained by gauging. And in specific cases, such as in an arrangement as illustrated in FIG. 15 (N=4, off-axis configuration, Hall effect device positions as illustrated, in a plane perpendicular to rotation axis A), it is also possible to determine suitable correction factors analytically.

Properly adjusting the amplification factors can make possible to strongly reduce non-linearities.

Similar corrections like those described above for equalizing the contributions of the individual Hall effect devices can also be applied in case of specific (non-uniform) relative arrangements or distributions of the Hall effect devices. In such cases, it can be advisable to individually adjust a time ti (i=1 ... N) during which the Hall voltage output of the respective Hall effect device is fed (directly or indirectly, i.e. after some processing such as amplification, cf. FIG. 16, amplifier 7) to the filtering unit F.

A correction like those described above for equalizing the contributions of the individual Hall effect devices is not an indispensable necessity. In various applications, this is not necessary. E.g., for counting rotations, one may completely dispense with related efforts.

Coming back to the sequence in which the Hall voltages of the Hall effect devices are (directly or indirectly) connected to the input of the filtering-or-resonating unit, it is also possible to apply some variations, e.g., by introducing (partial) repetitions. For example (for simplicity and compatibility with explanations above, we assume N=4):

Instead of carrying out the above-described offset compensation in the way of
w1/1-w1/2-w1/3-w1/4-w2/1-w2/2-w2/3-w2/4-w1/1-w1/2 ...
as suggested above (the boldfacing an the separating line of twice the length merely shall facilitate recognizing symmetries and kinds of repetition), one can also proceed like:
w1/1-w1/2-w1/3-w1/4-w1/1-w1/2-w1/3-w1/4-w2/1-w2/2 ...
(Note that the separating lines do not depict minus signs.)

Similarly, also in the other way of compensating offsets (making use of all four orthogonal but non-reverse wiring schemes), each of the four wiring schemes may be applied to each Hall effect device several times before applying another wiring scheme.

And it is also possible (in any of the offset compensation schemes) to repeat in the following way:
w1/1-w1/1-w1/2-w1/2-w1/3-w1/3-w1/4-w1/4-w2/1-w2/1-w2/2 ...

The repetitions in any of these cases can be twice, three times or more, and they may be combined.

It is also possible to successively probe each of the individual Hall effect devices with different wiring schemes, e.g., with two different wiring schemes, such as
w1/1-w2/1-w1/2-w2/2-w1/3-w2/3-w1/4-w2/4-w1/1-w2/1-w1/2 ...
or with four different wiring schemes, e.g., with two different wiring schemes, such as
w1/1-w2/1-w3/1-w4/1-w1/2-w2/2-w3/2-w4/2-w1/3-w2/3-w3/3-w4/3-w1/4-w2/4-w3/4-w4/4-w1/1-w2/1-w3/1-w4/1-w1/2 ...

And also here, repetitions can be made, e.g., for each Hall effect device, and, e.g., twice (or more times). A corresponding example with two wiring schemes and two-fold repetition is:
w1/1-w2/1-w1/1-w2/1-w1/2-w2/2-w1/2-w2/2-w1/3-w2/3-w1/3-w2/3-w1/4-w2/4-w1/4-w2/4-w1/1-w2/1-w1/2 ...

And note that in the above explanations of variations of how Hall effect devices are (direct or indirectly) connected to the input of the filtering-or-resonating unit, the wiring scheme numbers are not necessarily those illustrated in FIG. 3. This would merely be one of many possibilities. It is possible to do any assignment of wiring scheme numbers. Thus, if once a certain assignment of wiring scheme numbers to wiring schemes is accomplished, further variations of the before-last given example are possible, such as, e.g.,
w1/1-w4/1-w3/1-w2/1-w1/2-w4/2-w3/2-w2/2-w1/3-w4/3-w3/3-w2/3-w1/4-w4/4-w3/4-w2/4-w1/1-w4/1-w3/1-w2/1-w1/2 ...
or
w1/1-w3/1-w2/1-w4/1-w1/2-w3/2-w2/2-w4/2-w1/3-w3/3-w2/3-w4/3-w1/4-w3/4-w2/4-w4/4-w1/1-w3/1-w2/1-w4/1-w1/2 ...

Figure 11:
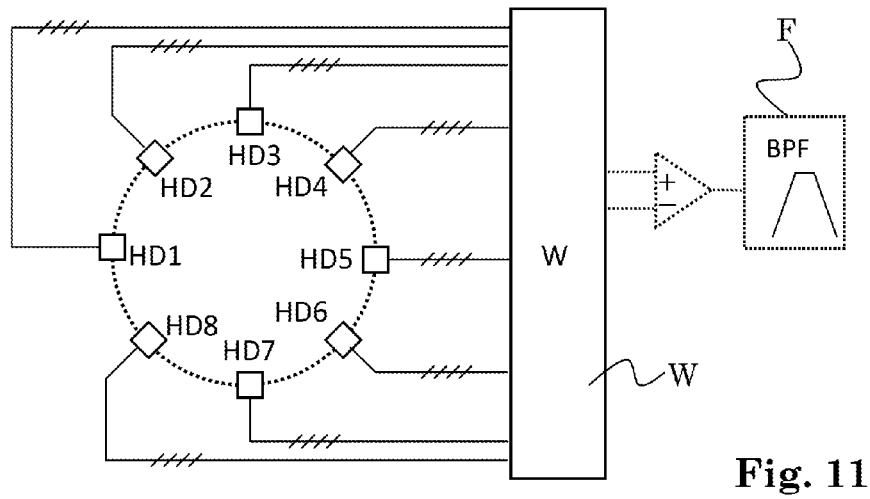
FIG. 11 an illustration of a detail of a sensor with eight Hall effect devices, prepared for differential measurements.

Coming back to arrangements of Hall effect devices, FIG. 11 is an illustration of a detail of a sensor 1 with eight Hall effect devices HD1, HD2, ... HD8. But in general applies: Other numbers of Hall effect devices can be provided, too. And the Hall effect devices need not be arranged in a common plane perpendicular to a rotation axis of the magnet. And the Hall effect devices need not be located on a circle. They can be arranged in any way, e.g., on corners of an arbitrary polygon having N corners, they may be arranged uniformly (by angle or distance) on an ellipse, or they may be arranged non-uniformly, or otherwise.

In FIG. 11, on the right hand side, in dotted lines, provisions are illustrated which may be made in order to carry out "differential measurements". For such measurements, a subtractor can be provided, wherein for achieving the same purpose, one could also use an adder, with or without an inverter. In the latter case, merely the wiring accomplished by wiring unit W has to be adjusted accordingly.

In "differential measurements", it is not merely one single Hall voltage of one Hall effect device that is fed (directly or indirectly) to the filtering-or-resonating unit at a time, but the difference of the Hall voltages of two of the Hall effect devices. Also this is accomplished in a fixed sequence and usually repeatedly. Assuming that the difference between the magnetic field strengths at two points is the larger the more distant the points are, it is recommendable to form the differences in Hall voltage between mutally oppositely located Hall effect devices, i.e., cf. FIG. 11, to form the differences V1–V5, V2–V6 and so on (Vj designating the Hall voltage of HDj). The sequence can be identical for the Hall effect devices providing the inverted and for those providing the non-inverted Hall voltage. E.g., the following sequence of Hall voltage differences can be fed to the filtering-or-resonating unit:

V1–V5; V2–V6; V3–V7; V4–V8; V5–V1, V6–V2; V7–V3; V8–V4 (and then repeat)

Of course, also such "differential measurements" can be combined with other described embodiments, e.g., with the ways for offset removal or the ways for avoiding spikes in the Hall voltages, or with the diverse possibilities of repeating wirings.

Furthermore, it shall be mentioned that each of the Hall effect devices mentioned herein can be a simple Hall effect device or can be composed of two or more simple Hall effect devices, the latter being wired in a parallel or serial or mixed parallel-and-serial way.

Figure 8:
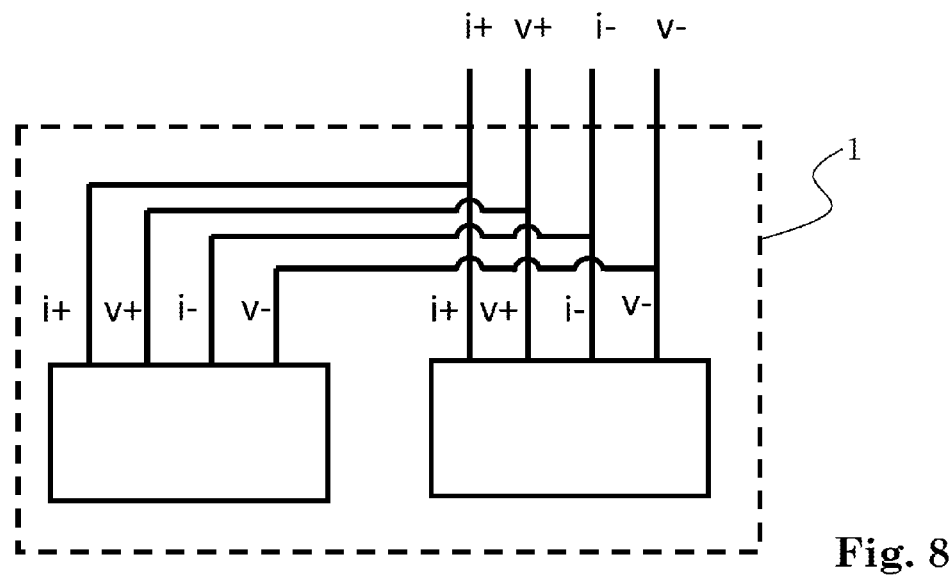
FIG. 8 a block-diagrammatical illustration of a composed Hall effect device.

For a Hall effect device composed of two simple Hall effect devices wired in parallel (with respect to their current supply), this is block-diagrammatically illustrated in FIG. 8. The composed Hall effect device 1 has its two pairs of connectors to which each of the two simple Hall effect devices are connected in parallel.

Figure 9:
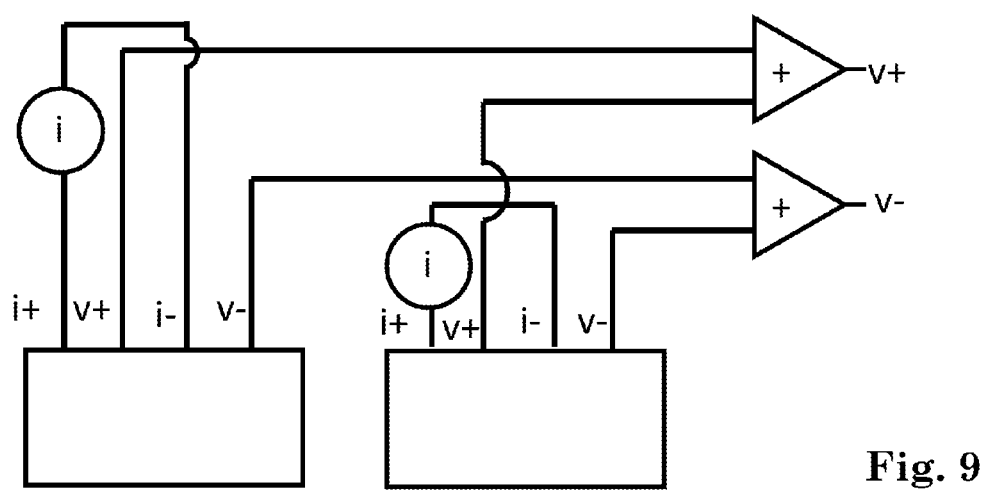
FIG. 9 a block-diagrammatical illustration of a composed Hall effect device.

FIG. 9 shows a block-diagrammatical illustration of another composed Hall effect device composed of two simple Hall effect devices. For each of the two simple Hall effect devices, a separate current supply is provided, wherein it is also possible to look upon these two separate current supplies as two components of one (composed) current supply. The voltages v– and v+, respectively, of the two simple Hall effect devices are fed to separate adders in order to provide the Hall voltage of the composed Hall effect device.

In general, a Hall effect device according to the invention may of course have more than those four contacts which correspond to the before-addressed two pairs of contacts. An example is given in FIG. 9 where six contacts are present: v+ and v– (outputted from the adders) and for each simple Hall effect device, one i+ and one i– contact is provided, wherein it is also possible to short two current contacts, one of each simple Hall effect device, e.g., the two i– contacts, such that the composed Hall effect device can be considered to have five contacts.

Analoguously to what is shown in FIG. 9, it is also possible to join (i.e. to short) two of the current contacts, e.g., the i– contact of the left and the i+ contact of the right simple Hall effect device, and use one (simple) current supply for supplying both simple Hall effect devices with bias current, thus realizing a composed Hall effect device comprising two simple Hall effect devices connected serially (with respect to their current supply). Otherwise, the composed Hall effect remains as depicted in FIG. 9, including the two adders.

It has been shown that it is possible to excitate a signal of a main frequency f composed of concatenated Hall voltage signals of Hall effect device in different locations with a preferably common detection axis (wherein the locations may but need not lie in one common plane, and wherein said plane need not be but preferably is aligned perpendicularly to a rotation axis of the magnet) and to filter such a signal so as to extract that main frequency f. And it has been shown that from a phase of such a signal or from its variation in time, an angular orientation or rotation speed of a magnet producing a magnetic field or another magnitude derivable therefrom can be derived in very simple and extremely fast ways. Therein, it is made use of spatial variations of the magnetic field along the locations of the Hall effect devices. When successively probing the Hall voltages of the Hall effect devices, various (repetitive) sequences can be used for removing or attenuating offsets and other disturbing effects and detrimental influences.

All the embodiments mentioned above can very well be realized in a single silicon chip, in particular using CMOS processes. So-called Hall plate devices are particularly well suited for such a realization.

All the embodiments described above can be used in position sensing (e.g., determining the rotational position of a rotor of a motor), in rotation counting, in rotational speed sensing and for similar purposes involving a magnetic field.

For example, a rotational-speed sensor can be provided which comprises at least one of the described sensors. It may, in addition, comprise an evaluation unit operationally connected to said output unit structured and configured for obtaining an output indicative of a speed of variation of said angular orientation.

Or a revolution counter can be provided which comprises at least one of the described sensors. It may, in addition, comprise an evaluation unit operationally connected to said output unit structured and configured for obtaining an output indicative of a number of revolutions of said magnet (or more precisely, of said magnetic field) that have taken place from an initial point in time. That evaluation unit may, e.g., comprise a counter.

Or an angular position sensor for determining an angular position of a rotatable body can be provided which comprises at least one of the described sensors. It may, in addition, comprise an evaluation unit operationally connected to said output unit structured and configured for obtaining an output indicative of said angular position of said rotatable body, wherein said rotatable body comprises said magnet. (Note that said magnet creates said magnetic field.)

Aspects of the embodiments have been described in terms of functional units. As is readily understood, these functional units may be realized in virtually any number of components adapted to performing the specified functions Furthermore, the filtering unit F could also be realized as a lowpass filter, and possibly in addition an offset remover (for suppressing DC voltage offsets), at least in the embodiments different from the one described above using a band pass filter having a particular quality factor. Generally, the main purpose of the filtering unit is to extract the sine wave of frequency f=1/Tf (having the sought phase) from the Hall voltage staircase signal.

The invention claimed is:

1. Sensor for sensing an angular orientation of a magnet producing a magnetic field, said sensor comprising
    N≥2 Hall effect devices, each having a detection direction and comprising a first and a second pair of connectors, wherein, in presence of said magnetic field, a flow of an electric current between the connectors of said first pair creates a Hall voltage between the connectors of the second pair induced by said magnetic field, unless a magnetic field component of said magnetic field along said detection direction is zero, wherein said N Hall effect devices are aligned such that they have a common detection direction lying along an axis;

a filtering-or-resonating unit comprising an input and an output, wherein a signal outputted from said output is referred to as filtered signal;

a wiring unit operationally connected to the respective second pair of connectors of each of said N Hall effect devices, structured and configured for selectively operationally connecting the connectors of said second pairs to said input of said filtering-or-resonating unit;

a control unit structured and configured for controlling said wiring unit in such a way that during a first time period of a duration Tf and in a fixed sequence of said N Hall effect devices, each of said N Hall effect devices is, with its second pair of connectors, successively operationally connected to said input of said filtering-or-resonating unit;

an output unit operationally connected to said output of said filtering-or-resonating unit structured and configured for obtaining from a filtered signal an output signal related to said angular orientation and outputting said output signal;

wherein said filtering-or-resonating unit is structured and configured for altering an inputted signal of a fundamental frequency $f=1/Tf$, said inputted signal containing, in addition to said fundamental frequency, higher harmonics, in such a way that an intensity of said higher harmonics is decreased relative to an intensity of said fundamental frequency.

2. The sensor according to claim 1, wherein said N Hall effect devices are positioned in one and the same plane.

3. The sensor according to claim 1, wherein said control unit is furthermore structured and configured for controlling said wiring unit in such a way that after said first time period of a duration Tf, the following is accomplished:

during a second time period of a duration Tf, subsequent to said first time period of a duration Tf, and in the same fixed sequence of said N Hall effect devices, each of said N Hall effect devices is, with its first pair of connectors, successively operationally connected to said input of said filtering-or-resonating unit.

4. The sensor according to claim 1, wherein said control unit is furthermore structured and configured for controlling said wiring unit in such a way that for at least one of said N Hall effect devices the first pair of connectors of the respective Hall effect device is connected to a current source already before connecting the second pair of connectors of the respective Hall effect device to said input of said filtering-or-resonating unit, wherein this wiring is maintained until and throughout the time during which the second pair of connectors of the respective Hall effect device is connected to said input of said filtering-or-resonating unit; and/or a connection of the first pair of connectors of the respective Hall effect device to a current source is established and maintained throughout and until after termination of the time during which the second pair of connectors of the respective Hall effect device is connected to said input of said filtering-or-resonating unit;

is accomplished.

5. Sensor according to claim 1, wherein said fixed sequence is a sequence related to or depending on a relative spatial position of said Hall effect devices.

6. The sensor according to claim 1, wherein each of said N Hall effect devices is arranged on one corner of a polygon having N corners, wherein said fixed sequence is a sequence which can be obtained by determining for each of said N Hall effect devices an angle enclosed by a straight line interconnecting the location of the respective Hall effect device with a center of gravity of said polygon with a straight line interconnecting the location of a first of said N Hall effect devices with the center of gravity of said polygon, and ordering the Hall effect devices according to their respective angles such that said angles constitute a monotonously increasing or monotonously decreasing series.

7. The sensor according to claim 1, wherein $N \geq 3$.

8. The sensor according to claim 1, wherein said N Hall effect devices are arranged on a circle.

9. The sensor according to claim 1, wherein said output unit comprises a phase detection unit.

10. An integrated circuit comprising at least one sensor according to claim 1.

11. A device or arrangement, comprising a sensor for sensing an angular orientation of a magnet producing a magnetic field, said sensor comprising:

$N \geq 2$ Hall effect devices, each having a detection direction and comprising a first and a second pair of connectors, wherein, in presence of said magnetic field, a flow of an electric current between the connectors of said first pair creates a Hall voltage between the connectors of the second pair induced by said magnetic field, unless a magnetic field component of said magnetic field along said detection direction is zero, wherein said N Hall effect devices are aligned such that they have a common detection direction lying along an axis;

a filtering-or-resonating unit comprising an input and an output, wherein a signal outputted from said output is referred to as filtered signal;

a wiring unit operationally connected to the respective second pair of connectors of each of said N Hall effect devices, structured and configured for selectively operationally connecting the connectors of said second pairs to said input of said filtering-or-resonating unit;

a control unit structured and configured for controlling said wiring unit in such a way that during a first time period of a duration Tf and in a fixed sequence of said N Hall effect devices, each of said N Hall effect devices is, with its second pair of connectors, successively operationally connected to said input of said filtering-or-resonating unit;

an output unit operationally connected to said output of said filtering-or-resonating unit structured and configured for obtaining from a filtered signal an output signal related to said angular orientation and outputting said output signal;

wherein said filtering-or-resonating unit is structured and configured for altering an inputted signal of a fundamental frequency $f=1/Tf$, said inputted signal containing, in addition to said fundamental frequency, higher harmonics, in such a way that an intensity of said higher harmonics is decreased relative to an intensity of said fundamental frequency.

12. The device or arrangement according to claim 11, said device or arrangement being at least one of an angular position sensor;
a rotary encoder;
a rotation speed sensor;
a revolution counter;
an electric motor.

13. A device or arrangement comprising a magnet producing a magnetic field and a sensor for sensing an angular orientation of said magnet, said sensor comprising:

N≥2 Hall effect devices, each having a detection direction and comprising a first and a second pair of connectors, wherein, in presence of said magnetic field, a flow of an electric current between the connectors of said first pair creates a Hall voltage between the connectors of the second pair induced by said magnetic field, unless a magnetic field component of said magnetic field along said detection direction is zero, wherein said N Hall effect devices are aligned such that they have a common detection direction lying along an axis;

a filtering-or-resonating unit comprising an input and an output, wherein a signal outputted from said output is referred to as filtered signal;

a wiring unit operationally connected to the respective second pair of connectors of each of said N Hall effect devices, structured and configured for selectively operationally connecting the connectors of said second pairs to said input of said filtering-or-resonating unit;

a control unit structured and configured for controlling said wiring unit in such a way that during a first time period of a duration Tf and in a fixed sequence of said N Hall effect devices, each of said N Hall effect devices is, with its second pair of connectors, successively operationally connected to said input of said filtering-or-resonating unit;

an output unit operationally connected to said output of said filtering-or-resonating unit structured and configured for obtaining from a filtered signal an output signal related to said angular orientation and outputting said output signal;

wherein said filtering-or-resonating unit is structured and configured for altering an inputted signal of a fundamental frequency $f=1/Tf$, said inputted signal containing, in addition to said fundamental frequency, higher harmonics, in such a way that an intensity of said higher harmonics is decreased relative to an intensity of said fundamental frequency.

14. The device or arrangement according to claim 11, wherein said device or arrangement comprises a rotatable body to which said magnet is fixed.

15. The device or arrangement according to claim 13, wherein said magnet is tiltable or rotatable about a rotation axis aligned along the before-mentioned axis, and wherein all of said N Hall effect devices are located in one and the same half-space defined by a plane comprising said rotation axis.

16. The device or arrangement according to claim 11, comprising an evaluation unit operationally connected to said output unit structured and configured for obtaining from said output signal a signal indicative of or derived from a variation in time of said angular orientation.

17. A method for sensing an angular orientation of a magnet producing a magnetic field, said method comprising the steps of a) providing N≥2 Hall effect devices, each having a detection direction and comprising a first and a second pair of connectors, wherein, in presence of said magnetic field, a flow of an electric current between the connectors of said first pair creates a Hall voltage between the connectors of the second pair induced by said magnetic field, unless a magnetic field component of said magnetic field along said detection direction is zero, wherein said N Hall effect devices are aligned such that they have a common detection direction lying along an axis;

b) providing a filtering-or-resonating unit comprising an input and structured and configured for altering an inputted signal of a fundamental frequency $f=1/Tf$, said inputted signal containing, in addition to said fundamental frequency, higher harmonics, in such a way that an intensity of said higher harmonics is decreased relative to an intensity of said fundamental frequency;

d) during a first time period of a duration Tf and in a fixed sequence of said N Hall effect devices: successively operationally connecting each of said N Hall effect devices, with its second pair of connectors, to said input of said filtering-or-resonating unit; and e) deriving from signals outputted by said filtering-or-resonating unit in reaction to carrying out step d) an output signal indicative of said angular orientation.

18. The method according to claim 17, comprising carrying out after step d) the step of d') during a second time period of a duration Tf subsequent to said first time period of duration Tf, and in the same fixed sequence of said N Hall effect devices: successively operationally connecting each of said N Hall effect devices, with its first pair of connectors, to said input of said filtering-or-resonating unit.

19. The method according to claim 17, comprising carrying out for at least one of said N Hall effect devices at least one of the steps of f1) operationally connecting the first pair of connectors of the respective Hall effect device to a current source already before operationally connecting the second pair of connectors of the respective Hall effect device to said input of said filtering-or-resonating unit and maintaining this wiring until and throughout the time during which said second pair of connectors of the respective Hall effect device is operationally connected to said input of said filtering-or-resonating unit;

f2) operationally connecting the first pair of connectors of the respective Hall effect device to a current source and maintaining this wiring throughout and until after termination of the time during which the second pair of connectors of the respective Hall effect device is operationally connected to said input of said filtering-or-resonating unit.

20. The method according to claim 17, comprising the step of:

g) obtaining from said output signal a signal indicative of or derivable from a variation in time of said angular orientation.

21. A method comprising carrying out a method according to claim 17, wherein the method is a method for at least one of:

determining an angular position of a rotatable body comprising said magnet;

determining a rotational speed of a rotating body comprising said magnet;

determining a change in rotational speed of a rotating body comprising said magnet;

determining a number of revolutions of a rotatable body that have taken place from an initial point in time.

22. A method for manufacturing a sensor for sensing an angular orientation of a magnet producing a magnetic field, said method comprising the steps of providing, in a single piece of semiconductor material, N≥2 Hall effect devices, a filtering-or-resonating unit, a wiring unit, a control unit, and an output unit, wherein:

each of said N Hall effect devices have a detection direction and comprise a first and a second pair of connectors, wherein, in presence of said magnetic field, a flow of an electric current between the connectors of said first pair creates a Hall voltage between the connectors of the second pair induced by said magnetic field, unless a magnetic field component of said magnetic field along said detection direction is zero, wherein said N Hall effect devices are aligned such that they have a common detection direction lying along an axis;

a said filtering-or-resonating unit comprises an input and an output, wherein a signal outputted from said output is referred to as filtered signal;

a said wiring unit is operationally connected to the respective second pair of connectors of each of said N Hall effect devices;

a said control unit is structured and configured for controlling said wiring unit;

said output unit is operationally connected to said output of said filtering-or-resonating unit;

wherein said filtering-or-resonating unit is a filter or resonator having a fundamental frequency $f=1/Tf$, and wherein the filtering-or-resonating unit is structured and configured for altering an inputted signal of a fundamental frequency $f=1/Tf$, said inputted signal containing, in addition to said fundamental frequency, higher harmonics, in such a way that an intensity of said higher harmonics is decreased relative to an intensity of said fundamental frequency.

23. The method according to claim 22, wherein the wiring unit is structured and configured for selectively operationally connecting the connectors of said second pairs to said input of said filtering-or-resonating unit;

wherein said control unit is structured and configured for controlling said wiring unit such that during a first time period of a duration Tf and in a fixed sequence of said N Hall effect devices, each of said N Hall effect devices is, with its second pair of connectors, successively operationally connected to said input of said filtering-or-resonating unit; and, wherein the output unit is structured and configured for obtaining from a filtered signal an output signal related to said angular orientation and outputting said output signal.

* * * * *